(12) United States Patent
Buoniello

(10) Patent No.: US 12,279,602 B1
(45) Date of Patent: Apr. 22, 2025

(54) RAPIDLY INTERCHANGEABLE FISHING LURE SYSTEM

(71) Applicant: Colin Buoniello, Tampa, FL (US)

(72) Inventor: Colin Buoniello, Tampa, FL (US)

( * ) Notice: Subject to any disclaimer, the term of this patent is extended or adjusted under 35 U.S.C. 154(b) by 40 days.

(21) Appl. No.: 18/102,811

(22) Filed: Jan. 30, 2023

Related U.S. Application Data

(63) Continuation-in-part of application No. 17/178,050, filed on Feb. 17, 2021, now abandoned.

(60) Provisional application No. 62/977,451, filed on Feb. 17, 2020.

(51) Int. Cl.
*A01K 85/00* (2006.01)

(52) U.S. Cl.
CPC .................. *A01K 85/029* (2022.02)

(58) Field of Classification Search
CPC ....... F16B 2/16; Y10T 403/592; A01K 91/04; A01K 91/03; A01K 85/18; A01K 85/029; A01K 85/1867; A01K 85/1857; A01K 85/1851; A01K 85/1843; A01K 85/1841; A01K 85/00; A01K 85/16
USPC ........... 43/42.49, 42.36, 42.09, 42.08, 42.22, 43/42.23, 43.31
See application file for complete search history.

(56) References Cited

U.S. PATENT DOCUMENTS

| | | | | |
|---|---|---|---|---|
| 4,807,387 A | * | 2/1989 | Dougherty, Jr. | A01K 85/16 43/42.22 |
| 5,299,379 A | * | 4/1994 | Hawk | A01K 91/04 24/607 |
| 5,461,820 A | * | 10/1995 | Sorola | F16G 15/08 59/95 |
| 6,386,789 B1 | * | 5/2002 | Chausse | F16B 21/165 403/322.2 |
| 6,848,288 B1 | * | 2/2005 | Derman | A44B 15/002 70/459 |
| 7,654,027 B1 | * | 2/2010 | Grover | F16B 21/165 403/322.2 |
| 7,891,903 B2 | * | 2/2011 | Klingenberg | B25B 31/005 403/322.2 |
| 8,087,844 B2 | * | 1/2012 | Turner | A01K 91/04 403/DIG. 1 |

(Continued)

FOREIGN PATENT DOCUMENTS

WO    WO-2016007643 A1 *  1/2016  ............. A01K 85/00

*Primary Examiner* — Timothy D Collins
*Assistant Examiner* — Maria E Graber
(74) *Attorney, Agent, or Firm* — John Rizvi; John Rizvi, P.A.—The Patent Professor®

(57) ABSTRACT

The rapidly interchangeable fishing lure system disclosed herein gives an angler the ability to switch tackle faster, more efficiently, and more cost effectively while fishing, and allows the angler to be more conscious of the environment. The system comprises, generally, an adapter mechanism between a fixed receiver and an interchangeable lure that allows the angler to change tackle without cutting the leader line in their setup. The interchangeable lure may be attached to the fixed receiver via the adapter mechanism, and may be disconnected from the receiver via the adapter mechanism. A second interchangeable lure may then be attached to the receiver via the adapter mechanism without the need for cutting any lines or replacing any attachments. In this way the angler may switch between tackle equipment rapidly, and as desired, without significant down time or the creation of waste.

13 Claims, 25 Drawing Sheets

(56) References Cited

U.S. PATENT DOCUMENTS

| | | | | |
|---|---|---|---|---|
| 8,615,920 B2* | 12/2013 | Taylor | ............... | A01K 91/04 |
| | | | | 43/42.49 |
| 9,015,985 B2* | 4/2015 | Pauley | ............. | A01K 95/005 |
| | | | | 43/43.12 |
| 9,309,912 B2* | 4/2016 | Yu | ............. | G01M 7/08 |
| 9,700,035 B2* | 7/2017 | Taylor | ............... | A01K 85/16 |
| 2011/0314723 A1* | 12/2011 | Taylor | ............... | A01K 85/16 |
| | | | | 43/4.5 |
| 2012/0051835 A1* | 3/2012 | Taylor | ............. | F16B 21/165 |
| | | | | 403/322.2 |
| 2021/0259225 A1* | 8/2021 | Saunders | ............. | A01K 85/18 |

\* cited by examiner

RAPIDLY INTERCHANGEABLE FISHING LURE SYSTEM

CROSS-REFERENCE TO RELATED APPLICATION

This application is a Continuation-in-Part of U.S. patent application Ser. No. 17/178,050, filed on Feb. 17, 2021, which in turn claims the benefit of U.S. Provisional Patent Application No. 62/977,451, filed on Feb. 17, 2020, which are incorporated herein by reference in their entirety.

FIELD OF THE INVENTION

The present invention relates generally to fishing lures, and more particularly, to a rapidly interchangeable fishing lure system.

BACKGROUND OF THE INVENTION

Fishing is the activity of attempting to catch fish, usually in their natural environments. Fishing may be done in or on any body of water containing fish or other sea life, though the term is not usually applied to catching farmed fish, which may be called farming, or to catching whales, which may be called whaling. Fishing activities may be performed for commercial purposes or as a recreational pastime, and the techniques used in fishing vary widely depending on the environment and type or volume of sea life to be caught.

One technique for fishing, and, likely, the original method by which fishing was done, is hand gathering. Gathering seafood by hand literally involves a user picking up sea life from the beach or tide pools, digging into the beach or shallows, or diving under the water to gather stationary or slower moving sea life. Shellfish or kelp, for example, may be gathered from the beaches or the shallows, while abalone or lobsters may be found in slightly deeper, though still accessible, waters. Clams, crabs, and other shellfish may be collected from intertidal areas using a spade or rake, and oysters, clams, and scallops may be simply lifted from their beds.

Another technique for fishing, called spearfishing, involves the use of a spear, harpoon, or trident to manually catch faster moving fish. Traditional spearfishing involves a user standing in still, clear water and stabbing their spear at fish as they pass by. The user must account for optical refraction at the water's surface, a phenomenon that makes fish appear to be higher in the water than they are, and a skilled user learns to aim lower than the fish appears to be. Modern spearfishing may involve the use of spearguns, which are powered implements designed to fire spears at high speeds and while under water.

A fishing net may also be used to catch sea life, and may allow users to access fish and other animals in deeper waters. A fishing net, modernly made from nylon fibers woven in a grid-like structure, may be placed openly on top of or into the water, and may then be drawn in to close around any sea life within its reach. Such a net may be used by an individual user casting it in the shallows, or may even be installed onto large commercial fishing vessels and dragged along the ocean floor. Trawling the ocean floor with fishing nets does result in severe damage to the ocean floor, and so efforts have been implemented to stop such practices.

Fish traps and other traps are also used in fishing, and generally involve placing an obstruction, such as a fishing weir, or a pot. such as a lobster trap, into the water to catch sea life. A fishing weir, for example, may be a series of obstructions placed in tidal waters or across a river to direct the movement of sea life into a trap or other enclosed area. A lobster trap may be placed in deep waters, and may have a one-way opening that allows one or more lobsters to enter, though not exit, the pot.

Angling, a method of fishing utilizing an angle, also known as a fish hook, is the principal method of sport fishing in modern times. The angle is usually attached to a fishing line, which itself is attached to a fishing rod. Fishing reels attached to the rod function as a mechanism for storing, retrieving, and paying out the fishing line and extending the reach of the user. Commercial fisheries also utilize certain angling methods, such as longlining or trolling, to catch fish and other sea life.

When angling, the fish hook may be dressed with bait, or a lure with hooks attached to it may be used instead. The species of fish caught by anglers, those who engage in angling, varies with geography. Salt water fish caught for sport may include swordfish, marlin, tuna, cod, and bass. Fresh water fish caught for sport, on the other hand, may include bass, pike, trout, salmon, and sunfish.

Modern fishing hooks tend to comprise J-shaped wires with a loop at one end and a sharp point and, often, a barb at the other. The hook may be baited naturally by using a common prey species of the target fish as an attractant. The fish may ingest the prey along with the hook, and the sharp point of the hook may become caught in the fish's mouth. The barb of the hook may prevent the hook from being withdrawn from the fish's mouth, and the fishing line may be drawn in by the user to pull the fish from the water.

Artificial bait, such as lures, may also be used to attract fish. The user of artificial bait utilizes a man-made lure that may appear as or may imitate prey animals of the target fish. The lure may even comprise a specialized presentation that imparts an enticing action to the lure, such as the use of movement, vibration, flashing, and coloration. Many lures are equipped with one or more hooks that are used to catch fish when they bite the lure.

Such lures and hooks are typically attached to the fishing line by the use of a leader line, which is a short section of tough fishing line tied to the full fishing line on the rod and reel and then tied, at its other end, to the lure or hook. When interchanging lures, though, such as when switching between types of lures or targeting different types of fish, the leader line must be cut to remove the lure and a new leader line must be tied on for the attachment of the new lure. This process can be difficult for many users, using up limited fishing time available to them, and is wasteful of fishing line. The implementation of a lure that can be interchanged without having to cut the leader line may reduce or eliminate such issues.

Therefore, there is a need in the art for a rapidly interchangeable fishing lure system that allows a user to change lures quickly and without cutting their leader line.

SUMMARY OF THE INVENTION

This summary is provided to introduce a selection of concepts in a simplified form that are further described below in the detailed description. This summary is not intended to identify key features of essential features of the claimed subject matter, nor is it intended to be used to limit the scope of the claimed subject matter. Furthermore, the claimed subject matter is not limited to implementations that solve any or all disadvantages noted in any part of this disclosure.

According to embodiments of the present disclosure, a rapidly interchangeable fishing lure system is disclosed.

In an implementation of the invention, a rapidly interchangeable fishing lure system may include a receiver main body, configured for the connection thereto of a fishing line, and a fishing lure, disconnectably attachable to the receiver main body.

In an implementation of the invention, the fishing lure may include an inner cavity defined by at least one inner side wall of the fishing lure. The receiver main body may include an elongated shaft removably insertable into the inner cavity of the fishing lure. The elongated shaft may include an outer sleeve portion, an inner shaft, and at least one movable pin, The outer sleeve portion may be elongately formed along a longitudinal direction. The inner shaft may be arranged longitudinally displaceable inside and relative to the outer sleeve portion, and may be operable for longitudinal displacement from outside the fishing lure system. The movable pin(s) may be arranged between the inner shaft and the outer sleeve portion, and may be selectively movable radially outward or inward relative to a central longitudinal axis of the elongated shaft responsively to operation of the inner shaft. The fishing lure system may further include one or more spacers, which may extend from one or more inner side walls of the fishing lure into the inner cavity of the fishing lure. The fishing lure system may be configured to adopt an assembled configuration in which the elongated shaft of the receiver main body is received within the inner cavity of the fishing lure, and the receiver main body and the fishing lure are disconnectably secured to one another by the movable pin(s) being arranged radially outward and abutting against at least one surface of the fishing lure. In the assembled configuration, the one or more spacers may stabilize the elongated shaft of the receiver main body laterally relative to the central longitudinal axis of the elongated shaft.

In another aspect, the receiver main body and fishing lure may be disconnectably threadable to one another.

In another aspect, the fishing lure may include an inner threaded cavity, and the receiver main body may include a threaded shaft. The threaded shaft of the receiver main body may be disconnectably threadable to the inner threaded cavity of the fishing lure.

In another aspect, the receiver main body and the fishing lure may be disconnectably attachable to one another by at least one snap-lock fastener.

In another aspect, the receiver main body may be removably insertable into an inner cavity of the lure. The at least one snap-lock fastener may include a snap-lock fastener arranged within the inner cavity.

In yet another aspect, the receiver main body and the fishing lure may be disconnectably attachable to one another by an elastic latch.

In another aspect, the receiver main body may be removably insertable into an inner cavity of the lure, and the elastic latch may be arranged within the inner cavity.

In another aspect, the receiver main body and the fishing lure may be disconnectably attachable to one another by a push-pull mechanism.

In another aspect, the receiver main body may be removably insertable into an inner cavity of the lure, and the push-pull mechanism may be at least partially arranged within the inner cavity.

In yet another aspect, the receiver main body may include an elongated shaft removably insertable into an inner cavity of the fishing lure.

In another aspect, the receiver main body may further include an eyelet configured to remain outside the fishing lure when the receiver main body is disconnectably attached to the fishing lure.

In another aspect, the elongated shaft may include an outer sleeve portion and an inner shaft arranged longitudinally movable inside and relative to the outer sleeve portion. The elongated shaft may further include at least one movable pin arranged between an inner shaft and the outer sleeve portion. The inner shaft may be operable for displacement from outside the fishing lure system. The at least one movable pin may be selectively pushed radially outward or freed to move radially inward by selective operation of the inner shaft. The receiver main body and the fishing lure may be disconnectably secured to one another by the at least one movable pin being arranged radially outward and abutting against at least one surface of the fishing lure.

In another aspect, the receiver main body may include a head having at least two radially protruding arms configured to provide a grip area. The inner shaft may end in a user-operable button arranged at and protruding from the head.

In yet another aspect, the receiver main body may be removably insertable into an inner cavity of the lure, and the at least one surface of the fishing lure may be arranged within the inner cavity.

In another aspect, the receiver main body may include a threaded shaft arranged at or near a proximal end of the receiver main body opposite to the elongated shaft. The receiver main body may further include at least one threaded piece in threaded engagement with the threaded shaft and selectively threadable towards and away from the lure when the elongated shaft is inserted in the inner cavity of the lure, to secure or disengage the receiver main body to or from the lure, respectively.

In another aspect, the at least one threaded piece may include a proximal threaded piece and a distal threaded piece, independently threadable towards or away from the lure.

In another aspect, the proximal threaded piece may include at least two radially protruding arms configured to provide a grip area.

In yet another aspect, the receiver main body may include a head including at least two radially protruding arms configured to provide a grip area.

In another aspect, the rapidly interchangeable fishing lure system may comprise a resilient material of construction.

In another aspect, the rapidly interchangeable fishing lure system may comprise a water-proof material of construction.

In another aspect, the rapidly interchangeable fishing lure system may comprise a rigid material of construction.

In another aspect, the rapidly interchangeable fishing lure system may comprise a reusable material of construction.

In yet another aspect, the rapidly interchangeable fishing lure system may comprise a washable material of construction.

In another aspect, the rapidly interchangeable fishing lure system may comprise a metal material of construction.

In another aspect, the rapidly interchangeable fishing lure system may comprise a plastic material of construction.

In another aspect, the rapidly interchangeable fishing lure system may comprise a multiple-component design.

In yet another aspect, the rapidly interchangeable fishing lure system may comprise a hanger.

In another aspect, the rapidly interchangeable fishing lure system may comprise an eyelet.

In another aspect, the rapidly interchangeable fishing lure system may comprise a fishing line receiver.

In another aspect, the rapidly interchangeable fishing lure system may comprise a lure receiver.

In yet another aspect, the rapidly interchangeable fishing lure system may comprise a plurality of lures.

In another aspect, the rapidly interchangeable fishing lure system may comprise a plurality of interchangeable lures.

In another aspect, the rapidly interchangeable fishing lure system may comprise a threaded adapter.

In another aspect, the rapidly interchangeable fishing lure system may comprise a ball and socket adapter.

In yet another aspect, the rapidly interchangeable fishing lure system may comprise a pinch adapter.

These and other objects, features, and advantages of the present invention will become more readily apparent from the attached drawings and the detailed description of the preferred embodiments or examples, which follow.

BRIEF DESCRIPTION OF THE DRAWINGS

The preferred embodiments and examples of the claimed subject matter will hereinafter be described in conjunction with the appended drawings provided to illustrate and not to limit the scope of the claimed subject matter, where like designations denote like elements, and in which:

It is to be understood that like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The rapidly interchangeable fishing lure system disclosed herein gives an angler the ability to switch tackle faster, more efficiently, and more cost effectively while fishing, and allows the angler to be more conscious of the environment. The system comprises, generally, an adapter mechanism between a fixed receiver and an interchangeable lure that allows the angler to change tackle without cutting the leader line in their setup. The interchangeable lure may be attached to the fixed receiver via the adapter mechanism, and may be disconnected from the receiver via the adapter mechanism. A second interchangeable lure may then be attached to the receiver via the adapter mechanism without the need for cutting any lines or replacing any attachments. In this way the angler may switch between tackle equipment rapidly, and as desired, without significant down time or the creation of waste.

Figures 1, 1A:
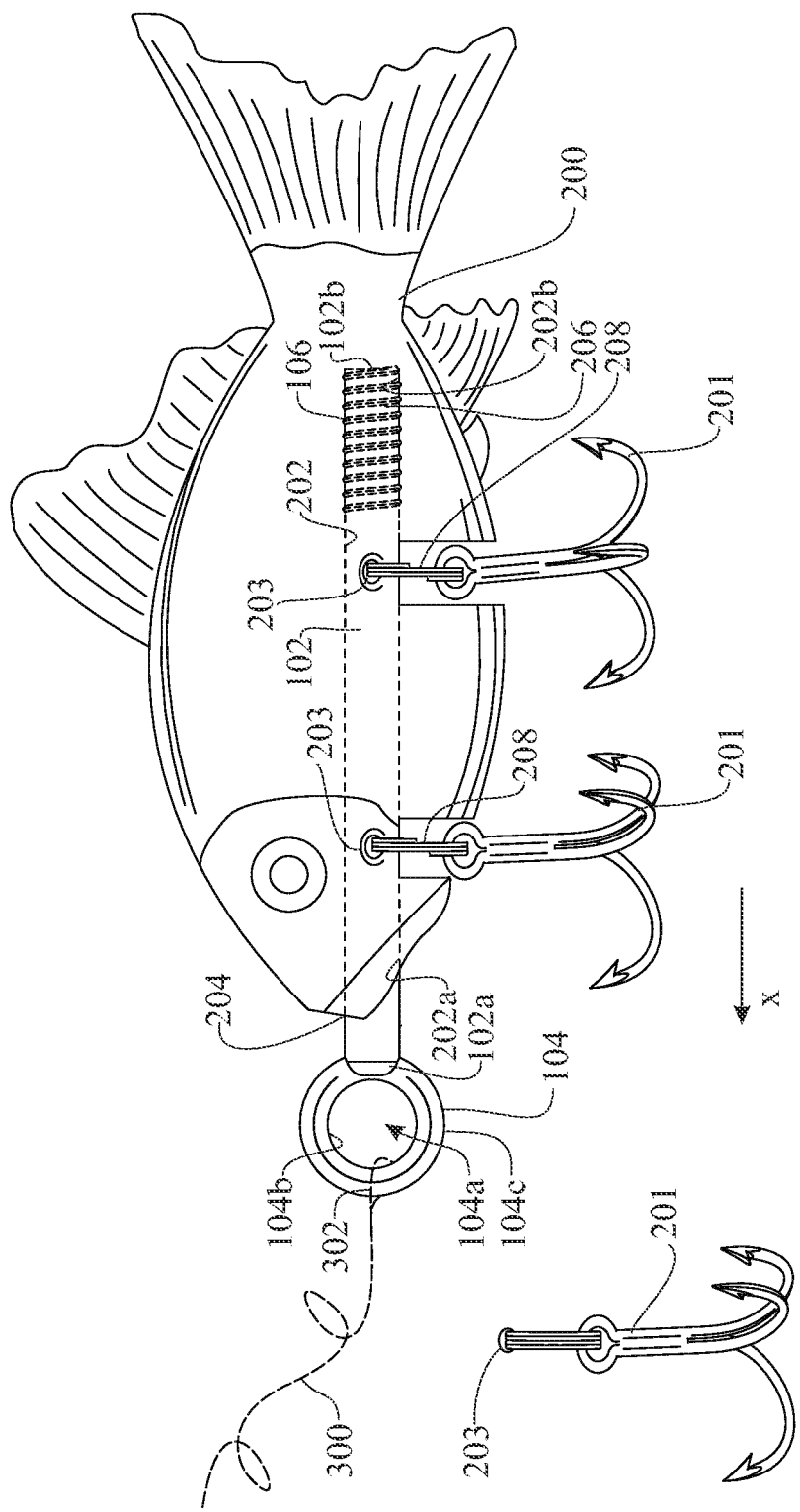
FIG. 1 shows a side view of a rapidly interchangeable fishing lure system, where a quick release rod is shown in dashed line within the lure, in accordance with aspects of the present disclosure.
FIG. 1A shows a quick release hook detached from the system, in accordance with aspects of the present disclosure.

The illustrations of FIGS. 1-10 illustrate an overall view of a rapidly interchangeable fishing lure system, in accordance with aspects of the present disclosure. With reference initially to FIG. 1, the rapidly interchangeable fishing lure system comprises a receiver main body 100, to which a lure 200 is attached. In some embodiments, such as the present embodiment, the receiver main body 100 may be generally elongately formed along a longitudinal direction x, configured to be arranged substantially vertically when the fishing lure system is in use. The elongated receiver main body 100 may extend into and through an opening or cavity 202 formed in the lure 200. In some embodiments, such as the present embodiment, the elongated main receiver body 100 may extend only partially through the lure 200, and the cavity 202 may be a blind opening (as shown) or a through opening extending through the lure 200. In other embodiments, the cavity 202 may be a through opening formed in the lure 200, and the elongate receiver main body 100 may extend entirely through the lure 200.

The receiver main body 100 may comprise, generally, a receiver rod or shaft 102, a receiver eyelet 104, and a lure receiving adapter 106. The receiver shaft 102 may further comprise a generally straight and rod or pole having a proximal end 102a and a distal end 102b. The cross section of the receiver shaft 102 may be any appropriate shape such as, but not limited to, square, rectangle, triangle, circle, or oval. The width or diameter of the receiver shaft 102 may be any appropriate width such as, but not limited to, one centimeter (1 cm); said width or diameter may be smaller or larger, as desired.

The receiver eyelet 104 may be attached to or may comprise the proximal end 102a of the receiver shaft 102, and may vary as appropriate to the cross-sectional shape of the receiver shaft 102. The lure receiving adapter 106 may be attached to or may comprise the distal end 102b of the receiver shaft 102, and may vary as appropriate to the cross-sectional shape of the receiver shaft 102. The receiver main body 100 may comprise a one-piece design or may comprise a multi-component design, as appropriate to the particular embodiment selected.

Figure 4:
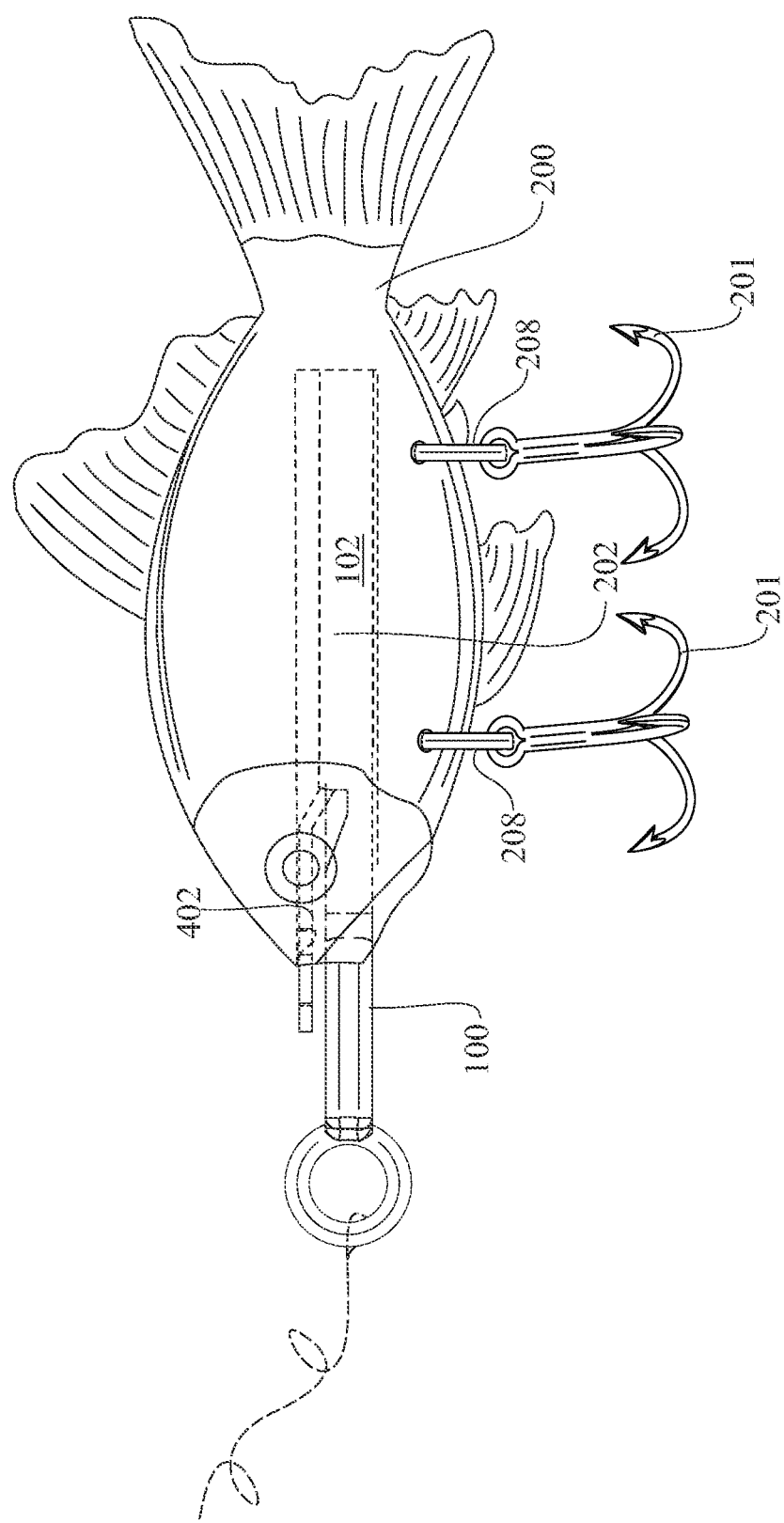
FIG. 4 shows side view of a latch connection system, in accordance with aspects of the present disclosure.
Figure 8:
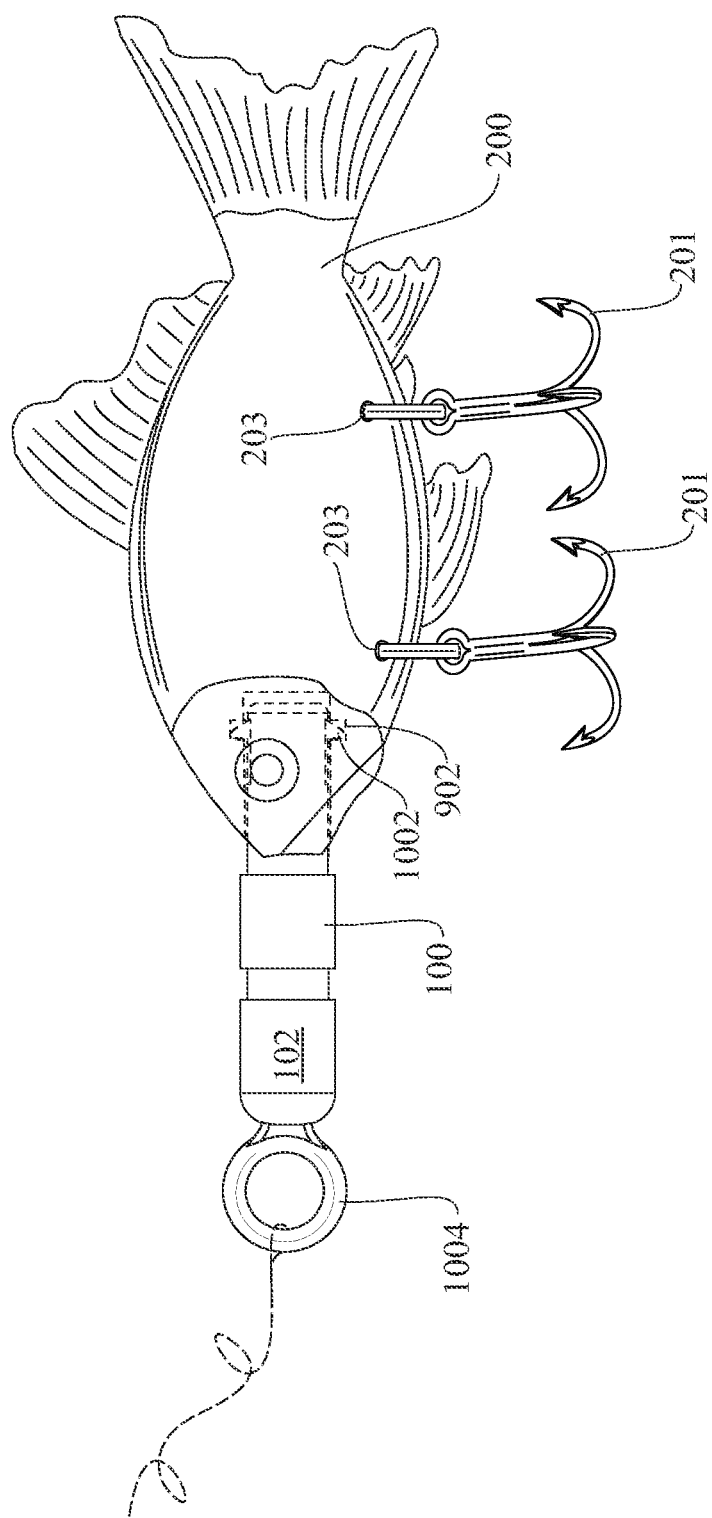
FIG. 8 shows a push-pull connection system, in accordance with aspects of the present disclosure.
Figure 9:
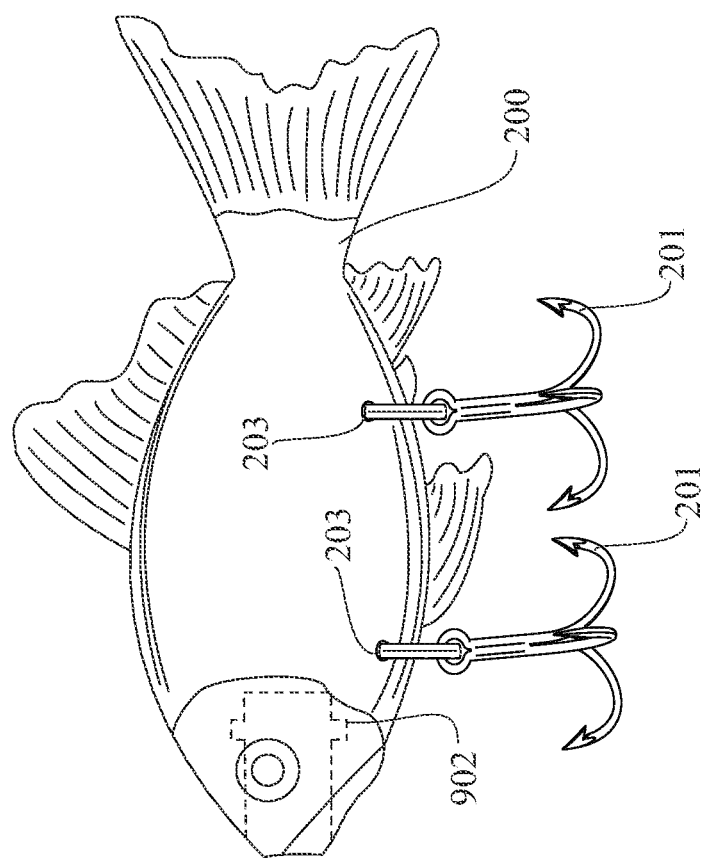
FIG. 9 shows side view of a lure of the push-pull connection system detached, in accordance with aspects of the present disclosure.
Figure 11:
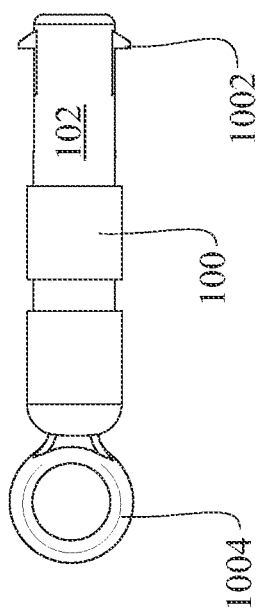
FIG. 11 shows a side view of the rod of the push-pull connection system, in accordance with aspects of the present disclosure.
Figure 10:
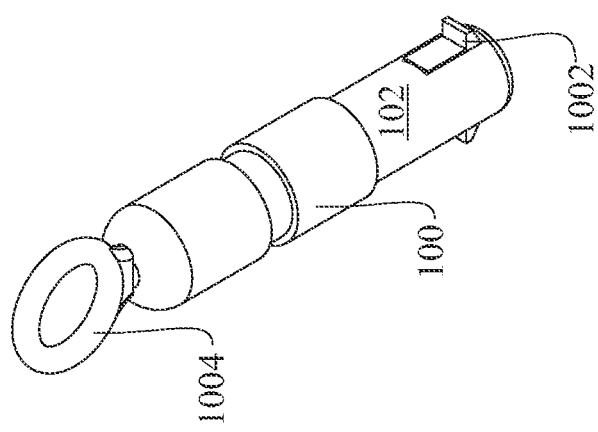
FIG. 10 shows a perspective view of a rod of the push-pull connection system detached, in accordance with aspects of the present disclosure.

By way of example, in an embodiment wherein the receiver shaft 102 comprises a substantially circular cross section and a one-piece design, the lure receiving adapter 106 may be a threaded adapter of the receiver shaft 102; for instance, in some embodiments, such as the present embodiment, the lure receiving adapter 106 may be a male threaded section of the receiver shaft 102. In such an embodiment, the lure 200 may be attached to the receiver main body 100 by placing the lure 200 over the receiver main body 100 and turning the lure 200, which may comprise a complementary threaded lure adapter 206 (e.g., a female threaded area configured to thread to the male threaded section provided by the lure receiving adapter 106), until the lure 200 is tightly affixed to the receiver main body 100. To remove the lure 200 from the receiver main body 100, a user may counter-turn the lure 200 until the complementary threads of the lure receiving adapter 106 and the lure adapter 206 are disengaged, and then pull the lure 200 from the receiver main body 100. It is to be understood that snap-lock mechanisms may be included that allows the pieces to be removably attached to one another (FIGS. 4 and 8). For example, pressing a protrusion on the receiver shaft 102 may cause a protrusion at the end of the rod to retract, allowing a user to withdraw the rod from the cavity 202. In other words, one or more protrusions may be selectively retracted and extended, or even be spring-biased, to allow the receiver shaft 102 to be selectively locked in the cavity 202. Such protrusions may be spring biased and fit into an indentation within the cavity 202. For example, FIGS. 8-11 show an indentation 902 and spring-loaded protrusion 1002 respectively as described herein.

By way of another example, in an embodiment wherein the receiver shaft 102 comprises a substantially squared or triangular cross section and a one-piece design, the lure receiving adapter 106 may be a ball and socket adapter. In such an embodiment, the lure receiving adapter 106 may comprise a spring-loaded ball installed in the distal end 102b of the receiver shaft 102, and the lure adapter 206 of the lure 200 may comprise an opening into which the ball may be seated. The lure 200 may be attached to the receiver main body 100 by placing the lure 200 over the receiver shaft 102 and advancing the lure 200 in the longitudinal direction x until the ball of the lure receiving adapter 106 is seated into the opening of the lure adapter 206. To remove the lure 200 from the receiver main body 100, a user may press the ball of the rule receiving adapter 106 until it disengages the opening of the lure adapter 206 and then pull the lure 200 from the receiver main body 100. Such an embodiment may further comprise a keyway and slot design to ensure the lure 200 may only be installed on the receiver main body 100 in one orientation.

By way of another example, in an embodiment wherein the receiver shaft 102 comprises a substantially squared or triangular cross section and a one-piece design, the lure receiving adapter 106 may be a spring-loaded pinch adapter. In such an embodiment, the lure receiving adapter 106 may comprise a plurality of spring-loaded leaves or arms installed in the distal end 102b of the receiver shaft 102, and the lure adapter 206 of the lure 200 may comprise an opening through which the leaves or arms may pass and then engage. The lure 200 may be attached to the receiver main body 100 by first pressing the leaves or arms of the lure receiving adapter 106 together, placing the lure 200 over the receiver shaft 102, and advancing the lure 200 until the leaves or arms of the lure receiving adapter 106 pass through the lure adapter 206 and elastically open up to engage an open end of the lure adapter 206. To remove the lure 200 from the receiver main body 100, a user may press the leaves or arms of the rule receiving adapter 106 until they may be passed through the lure adapter 206 and then pull the lure 200 from the receiver main body 10 the proximal end of the receiver shaft 1020. Such an embodiment may further comprise a keyway and slot design to ensure the lure 200 may only be installed on the receiver main body 100 in one orientation.

In an embodiment comprising a one-piece design, the receiver eyelet 104 may comprise the proximal end 102a of the receiver shaft 102. The receiver eyelet 104 may be any appropriate shape having a central opening 104a, an inner side 104b defining the central opening 104a, and an outer side 104c opposite the inner side 104b, as shown. The inner side 104b and outer side 104c may define an inner diameter and an outer diameter, respectively. The outer side 104c of the receiver eyelet 104 may be beveled or rounded to prevent snagging, fraying, or cutting of the leader line or fishing line. The inner side 104b of the receiver eyelet 104 may be rounded so as to limit restrictions on the range of motion of the receiver main body 100 and the lure 200 around the leader line or fishing line.

The leader line or fishing line 300 may be installed into the receiver eyelet 104 by passing the line through the central opening 104a of the receiver eyelet 104 and then implementing an appropriate knot 302 or means for securing the line to the receiver eyelet 104. In this way a user may cast the line 300, as they normally would, with the receiver main body 100 and lure 200 securely attached to the leader line or fishing line 300. When the user wishes to switch out their lure 200 for another, they would simply remove the lure 200 from the receiver main body 100, without removing the receiver main body 100 from the leader line or fishing line 300, and attach a new lure 200 to the receiver main body 100.

In an embodiment comprising a multi-component design, the receiver eyelet 104 may be removably attached to the proximal end 102a of the receiver shaft 102. The attachment of the receiver eyelet 104 to the receiver shaft 102 may be any appropriate attachment such as, but not limited to, a threaded attachment, a ball and socket attachment, or a pinch attachment. By such an attachment, the receiver eyelet 104 may be kept attached to the leader line or fishing line 300 of the user's setup, while the receiver shaft 102 may be interchanged for a differently-sized or differently-shaped receiver shaft 102 appropriate to various types of lures.

By way of example, a user may begin by using a type of lure known as plug, which is meant to mimic the movement and appearance of natural prey fish. Such a lure may appear as a full-bodied fish, and may have fishing hooks attached along its dorsal or ventral sides. Due to the characteristics of such a lure, the receiver main body 100 may be able to pass through the entire lure 200. As such, the receiver shaft 102 may comprise a squared or triangular cross section having a keyway and slot alignment mechanism, and may further comprise lure receiving adapter 106 that is a spring-loaded pinch adapter that passes out of the rear of lure adapter 206. The spring-loaded pinch adapter may engage the back of the lure adapter 206 to keep the lure 200 attached to the receiver main body 100 without interfering with any of the hooks.

If the user then wishes to switch to a different type of lure, such as a plug lure with hooks attached at its tail, or spinner or spoon lures wherein the hook is attached to its trailing edge, the user must necessarily implement a different type of attachment mechanism. Where the lures 200 have the hooks attached to their trailing edge, the receiver main body 100 may not pass all the way through the lure 200. In such a situation the system may, instead, utilize a threaded lure receiving adapter 106 and lure adapter 206 that allows the receiver main body 100 to engage the lure 200 within the body of the lure 200 itself. This variation in the attachment mechanism also requires that the receiver shaft 102 comprise a circular cross section without a keyway and slot alignment mechanism.

To facilitate such a transition the user may first separate the first embodiment lure 200 from the first embodiment receiver shaft 102, with the squared or triangular cross section having a keyway and slot alignment mechanism, and then remove the first embodiment receiver shaft 102 from the receiver eyelet 104. A second embodiment receiver shaft 102, having the circular cross section without a keyway and slot alignment mechanism, may then be attached to the receiver eyelet 104, and a second embodiment lure 200 may then be attached to the second embodiment receiver shaft 102. In this way the user is able to use multiple and varied types of lures 200 without cutting the receiver eyelet 104 from the leader line or the fishing line.

The lure 200 may comprise, generally, the aforementioned cavity 202, a receiver inlet 204, and the aforementioned lure adapter 206. The cavity 202 provides a shaft housing, i.e. a housing configured to receive the receiver shaft 102. The cavity 202 may comprise a generally straight and substantially vertical central opening having a proximal end 202a and a distal end 202b. The cross section of the cavity 202 may be any appropriate shape complementary to the shape of the receiver shaft 102 of the selected embodiment. The diameter of the cavity 202 may be any appropriate width complementary to the width of the receiver shaft 102 of the selected embodiment.

The receiver inlet 204 may be attached to or may comprise the proximal end 202a of the cavity 202, and may vary as appropriate to the cross-sectional shape of the receiver shaft 102. The lure adapter 206 may be attached to or may comprise the distal end 202b of the cavity 202, and may vary as appropriate to the attachment mechanism of the particular embodiment. The lure 200 may comprise a one-piece design or may comprise a multi-component design, as appropriate to the particular embodiment selected.

In one embodiment the receiver inlet 204 may comprise an opening in the proximal end of the lure 200 contiguous with the cavity 202. The receiver main body 100 appropriate to the lure 200 may be passed through the receiver inlet 204 by leading with the lure receiving adapter 106 and advancing the receiver main body 100 until the lure receiving adapter 106 and the lure adapter 206 are fully engaged. The receiver shaft 102 may comprise a length appropriate to the embodiment of the lure 200 such that when the lure receiving adapter 106 and the lure adapter 206 are fully engaged, the eyelet 104 is positioned against or near the receiver inlet 204.

In an embodiment wherein the eyelet 104 is positioned against the receiver inlet 204, such as an embodiment wherein the adapter mechanism is a threaded mechanism and the lure 200 is turned onto the receiver shaft 102, the friction associated with such positioning may aid to further lock the lure 200 onto the receiver main body 100. In an embodiment wherein the lure 200 is pushed onto the receiver shaft 102 without being turned, the eyelet 104 and receiver inlet 204 may further comprise a means for locking, such as a hook or loop device, to provide additional support for keeping the lure 200 attached to the receiver main body 100.

The lure 200 may further comprise any appropriate lure known in the art, and the composition of the particular embodiment may vary based on the type of lure selected. The modularity of the present system may serve to facilitate the implementation of significantly varied lures on a single leader line or fishing line, without the need for cutting or replacing leader lines and fishing lines.

By way of example, one type of plug lure may be known as a minnow, which may be a long, slender lure that imitates shallow-water prey fish. Another type of plug lure may be a shorter, fatter lure that imitates deeper-water prey fish. Both of such lures 200 may comprise an identical, short cavity 202, rounded receiver inlet 204, and threaded lure adapter 206 for receiving the same first embodiment receiver main body 100. In such an embodiment, the minnow-type lure 200 may be used to pursue shallow-water fish and then removed from the first embodiment receiver main body 100. The plug-type lure may then be attached to the first embodiment receiver main body 100, and the user may pursue deeper-water fish, without a need for cutting off the previous lure or attaching a new leader line to the fishing line.

In an embodiment wherein the minnow-type lure comprises a longer cavity 202, rounded receiver inlet 204, and threaded lure adapter 206 for receiving a second embodiment receiver main body 100, the two embodiments of the receiver main body 100 may be removably attached to the same receiver eyelet 104. In such an embodiment the minnow-type lure 200 may be used to pursue shallow-water fish and then removed from the second embodiment receiver main body 100. The second embodiment receiver main body 100 may then be removed from the eyelet 104, and the first embodiment receiver main body 100 may be attached to the eyelet 104. The plug-type lure may then be attached to the first embodiment receiver main body 100, and the user may pursue deeper-water fish, without a need for cutting off the previous lure or attaching a new leader line to the fishing line.

The lures 200 may further comprise any appropriate accessories for aiding in the catching of fish known in the art. By way of example, a jig lure 200 may comprise a weighted hook with a lead component and metallic weights for fishing in salt water down to 300 meters. A surface lure 200 may comprise an opening on its leading edge that allows it to stay near the surface of the water and may generate popping, burbling, or buzzing sounds as it is drawn in. A spoon lure 200 may have a wide, flat, curved body that allows it to move unpredictably through the water and glint off reflections of light that attract certain fish. A spinnerbait lure 200 may further comprise a spinning element attached to it that causes it to spin around its longitudinal axis while being drawn in, to attract certain types of fish.

The lures 200 may further comprise any appropriate custom accessories known in the art, such as the addition of feathers or hairs, which users may add to their lures 200 to make them more distinct or to aid in the catching of fish based on personal preference or experience. The lures 200 may further comprise electronic components, such as flashing lights or sound emitters, and a battery housing, for providing additional functionality to a user based on preferences.

The rapidly interchangeable fishing lure system may be substantially constructed of any suitable material or combination of materials, but typically is constructed of a resilient material or combination of materials such that the device is resistant to tearing and damage as a result of compression, stretching, twisting, heating, or submersion in water. As an example, and without limiting the scope of the present invention, various exemplary embodiments of the rapidly interchangeable fishing lure system may be substantially constructed of one or more materials of plastic, acrylic, polycarbonate, steel, aluminum, brass, fiberglass, carbon fiber, or combinations thereof. In some embodiments the rapidly interchangeable fishing lure system may be coated, lined, or otherwise insulated to prevent fluid damage to the device.

In one embodiment, the material of construction may vary from one component to the next within the device. By way of example, the receiver main body 100 may comprise a wear-resistant material of construction, such as metals, to increase the lifespan of the rapidly interchangeable fishing lure system and reduce the drag resistance of the receiver main body 100 against the interchangeable lure 200. The interchangeable lure 200 may, instead, comprise a lightweight material of construction, such as plastics, so that the interchangeable lure 200 may be more easily handled and may reduce the overall weight of the rapidly interchangeable fishing lure system.

In one embodiment, the rapidly interchangeable fishing lure system may comprise a resilient material of construction that comprises a material having antimicrobial properties or comprises a layering of antimicrobial material or coating. Antimicrobial properties comprise the characteristic of being antibacterial, biocidal, microbicidal, anti-fungal, anti-viral, or other similar characteristics, and the oligodynamic effect, which is possessed by copper, brass, silver, gold, and several other metals and alloys, is one such characteristic. Copper and its alloys, in particular, have exceptional self-sanitizing effects. Silver also has this effect, and is less toxic to users than copper. Some materials, such as silver in its metallic form, may require the presence of moisture to activate the antimicrobial properties.

Figure 2:
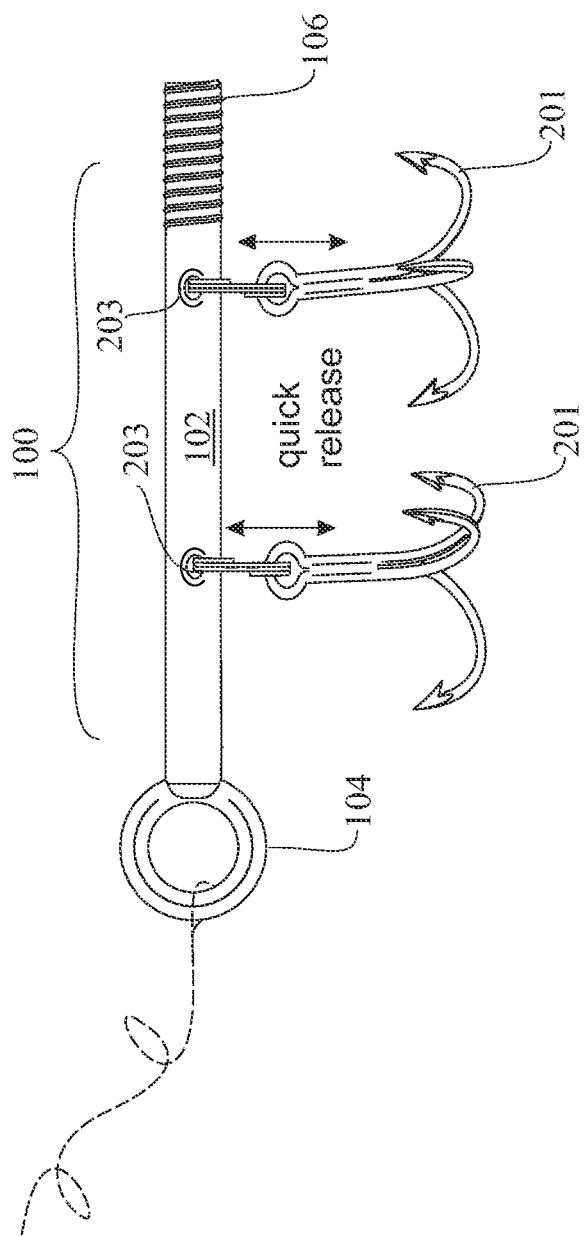
FIG. 2 shows a quick release hook attached to a rod insert and how the quick release hooks attach and detach to the rod, in accordance with aspects of the present disclosure.
Figure 3:
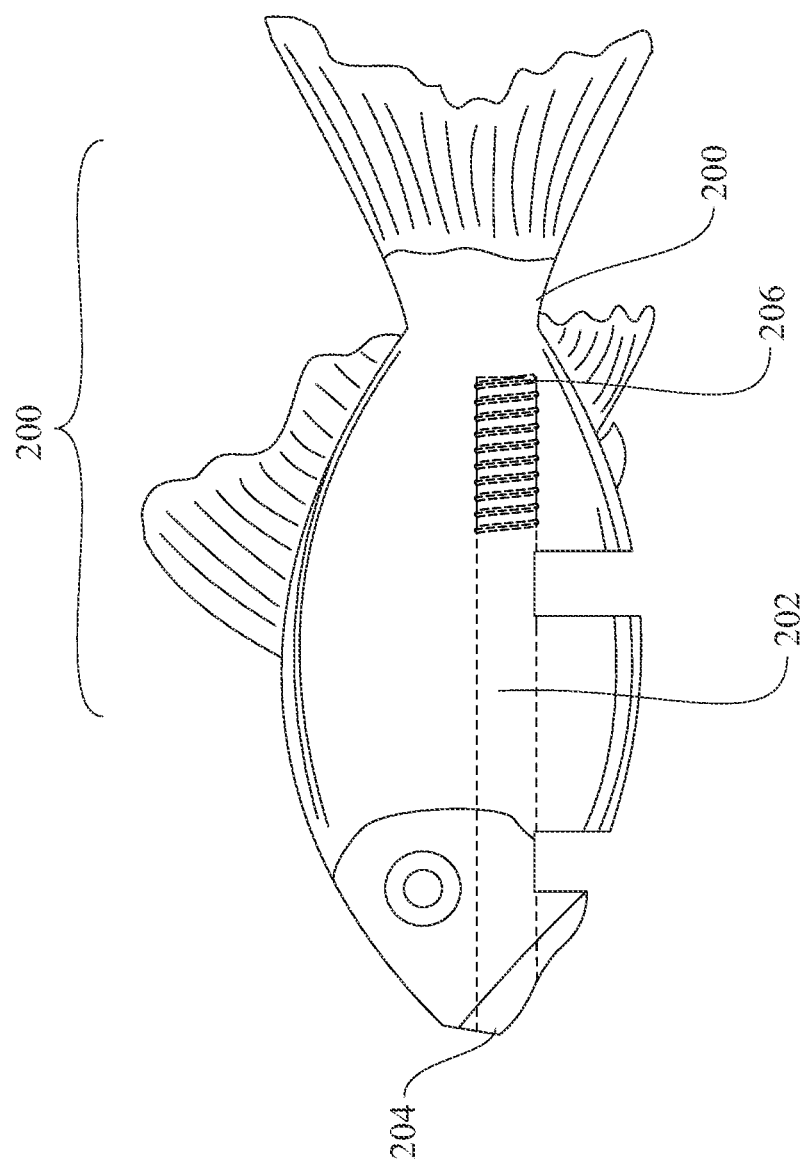
FIG. 3 shows a side view of the lure, detached from the rod, in accordance with aspects of the present disclosure.
Figure 5:
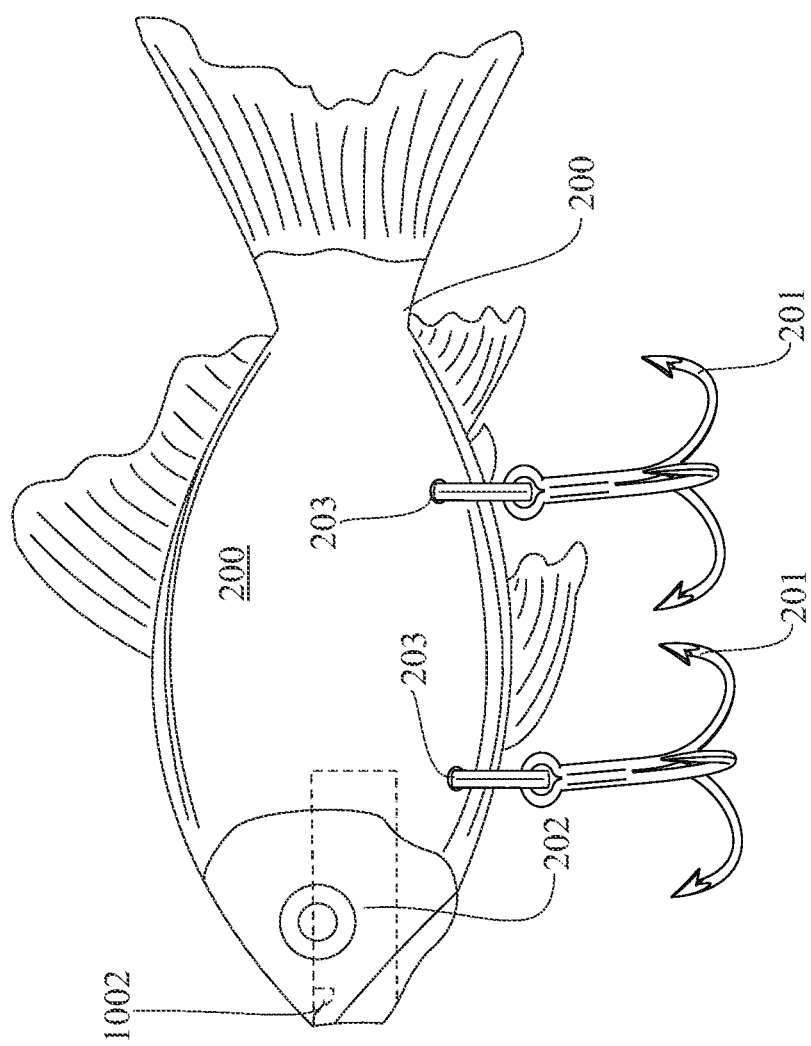
FIG. 5 shows a side view of an exemplary detached lure for the latch connection system, in accordance with aspects of the present disclosure.
Figure 7:
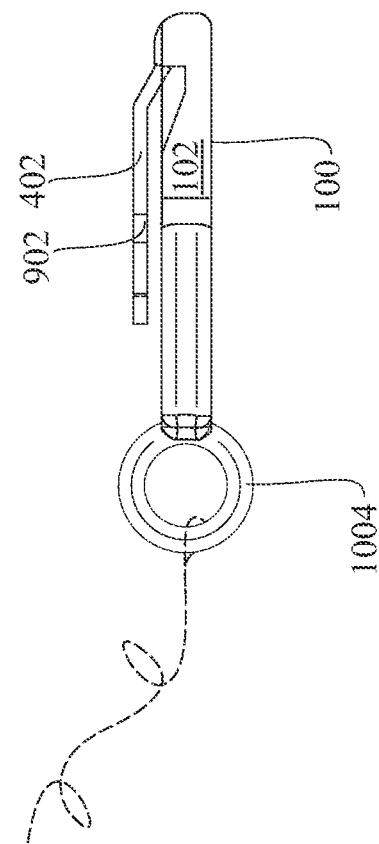
FIG. 7 shows a side view of a detached latch connection rod, in accordance with aspects of the present disclosure.
Figure 6:
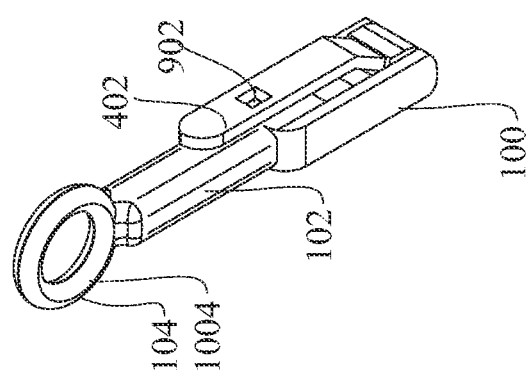
FIG. 6 shows a perspective view of a detached latch connection rod, in accordance with aspects of the present disclosure.

As shown in FIGS. 1 and 2, the system may include one or more hooks 201, which may be removably attachable to the receiver shaft 102 and/or the lure 200. The hooks 201 may be removably attachable through any of the herein described mechanisms. For example, the hooks 201 may have a spring-biased protrusion that snaps into holes 108 on the receiver shaft 102. A ring 208, such as a coiled ring, may interface between the spring biased protrusion and the hooks 201, or between the hooks 201 and the receiver shaft 102 or lure 200, as shown. As shown in FIG. 5, the hooks 201 (such as via the respective rings 208) attach at attachment points 203. For instance, the illustration of FIGS. 1 and 2 show a first embodiment in which the hooks 201 are attached to attachment points 203 formed in the receiver shaft 102. The illustrations of FIGS. 4 and 5, instead, show alternative embodiments in which the hooks 201 (such as via the respective rings 208) are attached to attachment points 203 in the lure 200. Further embodiments are contemplated in which the hooks 201 may attach to attachment points on both the receiver shaft 102 and the lure 200.

As shown in FIG. 4, a snap-lock latch mechanism can be implemented to attach the receiver shaft 102 to the lure 200. A latch 402 comprised in the receiver main body 100 may fit into a protrusion on the lure 200, as a non-limiting example. However, it is to be understood that either one of the receiver main body 100 or the lure 200 may include the protrusion, and the other of receiver main body 100 and the lure 200 may include the latch 402.

As further shown in FIG. 4, the receiver shaft 102 may travel all the way to the back of the lure cavity 202, and a secondary securing mechanism such as a screw thread may aid the latch mechanism or the push-pull mechanism of FIG. 8.

Turning to FIGS. 8-11, shown is a push-pull mechanism for connecting the receiver main body 100 to the lure 200. The receiver main body 100 includes a push-pull handle which causes the spring-loaded protrusion 1002 (FIG. 10) to displace inward or outward of corresponding indentations 902 formed in the cavity 202 of the lure 200, allowing the receiver shaft 102 to be removably attached and detached. For example, the protrusion 1002 may be spring biased such that pushing or pulling a handle 1004 provided by the receiver eyelet 104 causes the protrusion 1002 to act against or in a direction of the spring bias to allow the receiver shaft 102 to be removed and attached in a quick, efficient, and secure manner. As a non-limiting example, the handle 1004 telescopes at least to some degree with respect to the receiver shaft 102 to cause the handle 1004 to displace and move the protrusions.

It is to be understood that the methods and configurations mentioned above may be appropriately combined, and the spirit and scope of the disclosure is not to be limited to sets of features being grouped. For example, any of the rod attachment mechanisms could benefit from a screw arrangement in the cavity to ensure further security. For example, the mating screw thread would allow the receiver main body 100 to be generally secure in the cavity before the snap lock mechanisms have the opportunity to engage. Furthermore, it is to be understood that the locations of protrusions and matching indentations maybe swapped, such that a protrusion could be either on the lure 200 or the receiver main body 100 without departing from the spirit and scope of the disclosure.

Figure 14:
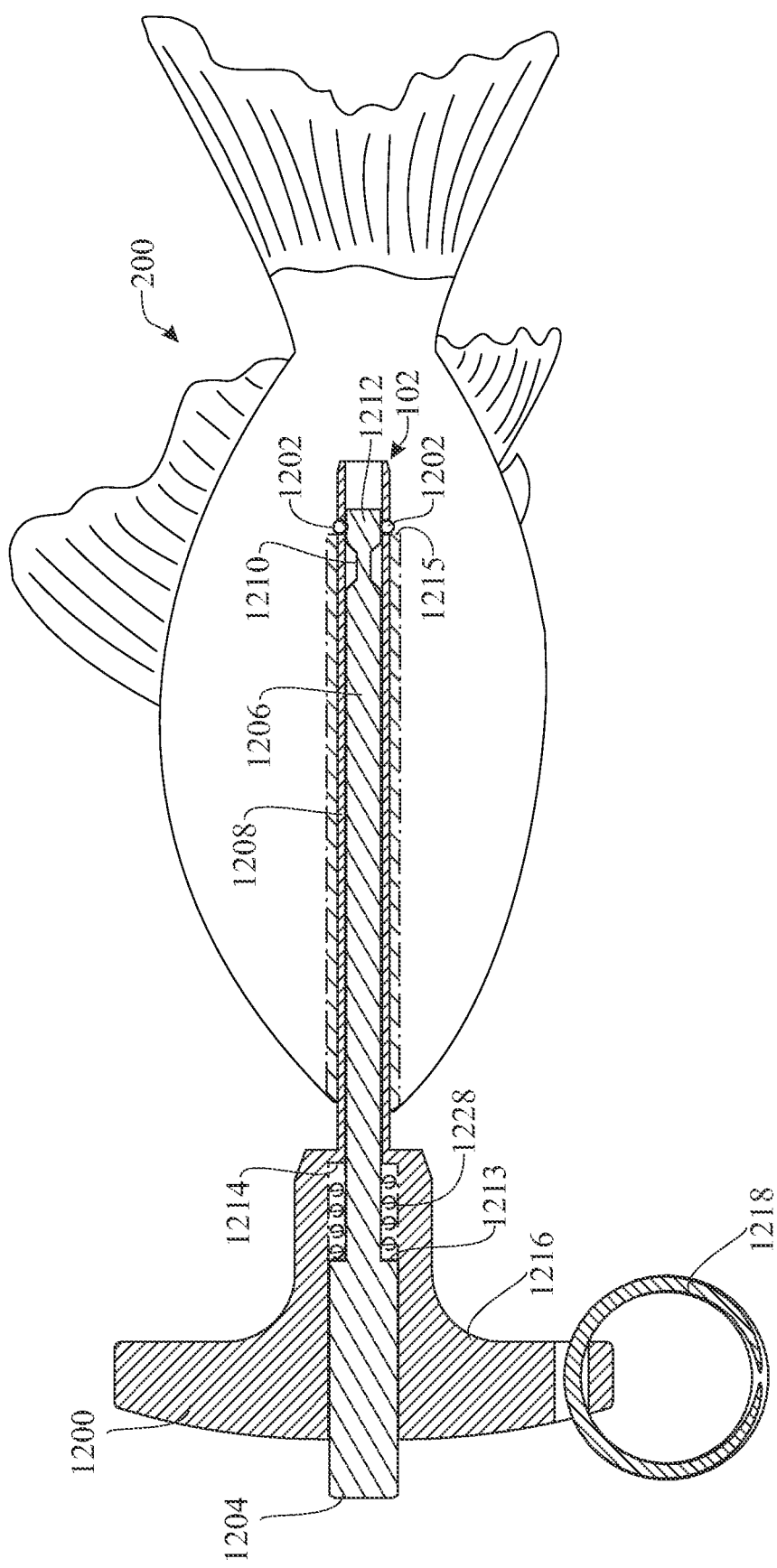
Figure 15:
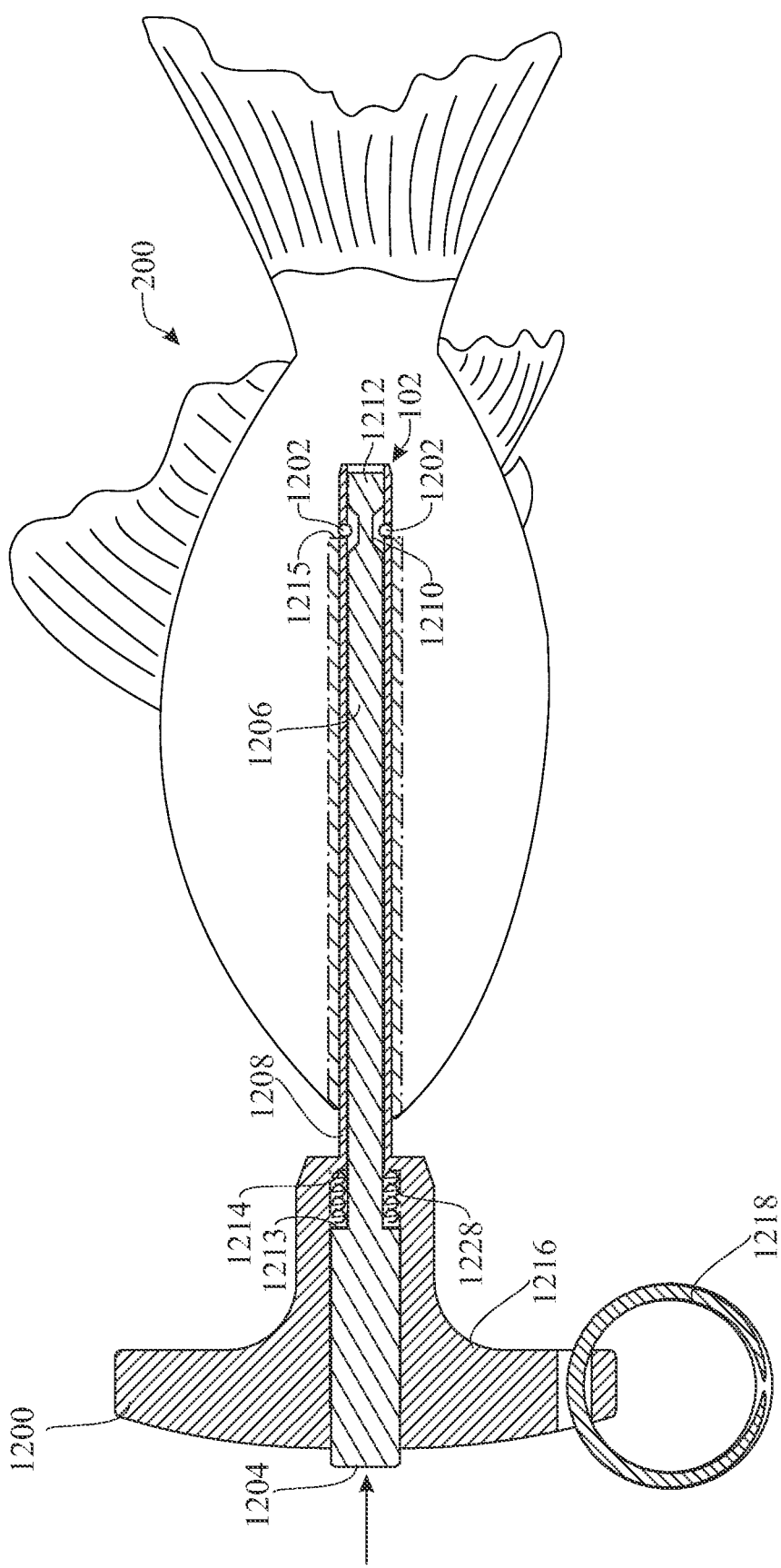
Figure 16:
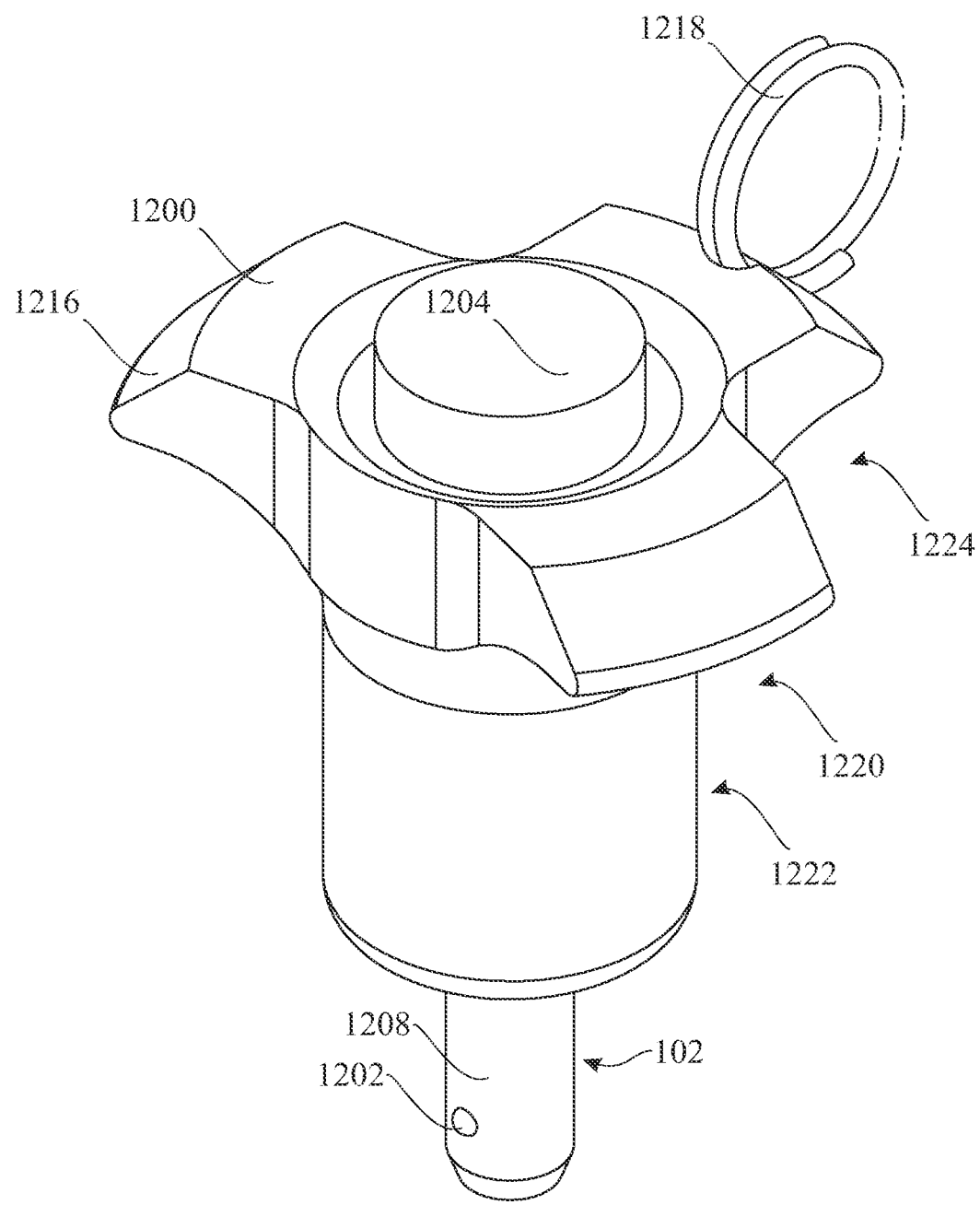
FIGS. 16-19 show an adjustable clamping distance mechanism and its method of attachment, in accordance with aspects of the present disclosure.

The illustrations of FIGS. 12-24 show other mechanisms for easily and removably attaching the rod or receiver main body. For example, FIGS. 12-15 show a receiver main body 100 having a head 1200, one or more displaceable balls or pins 1202, and a button 1204 configured to displace the pins 1202. As best shown in FIGS. 14 and 15, the receiver main body 100 includes a receiver shaft 102 comprising an inner rod or shaft 1206 that displaces and translates within an outer sleeve portion 1208. As can be seen from the cross-section of FIG. 15, the button 1204 may be spring biased such that when the button 1204 is pressed, the pin 1202 displaces. The pin 1202 displaces such that the pin 1202 is either in an extended or retracted position. For example, in the retracted position, the rod is allowed to be inserted and removed freely from the cavity of the lure. When the pin 1202 is in an extended position, the rod may be securely locked inside the cavity such that the rod does not come loose during fishing activities.

The button 1204 may be spring-biased in any appropriate way. For example, a compression spring 1228 may be located between a lip 1213 of the button 1204 and an inner wall 1214 of the head 1200, as shown, or of the outer sleeve portion 1208. The outer sleeve portion 1208 could be a continuous uniform piece with the housing or separate pieces (e.g. the shaft may be a separate piece that is fixed to the head). Thus, when the button 1204 is pressed against the biasing force of the spring 1228 (e.g. keeping the outer sleeve portion 1208 and the head 1200 fixed), the inner shaft 1206 translates within the outer sleeve portion 1208. The inner shaft 1206 may include one or more indentations 1210 that are configured to selectively align with, and receive, the one or more pins 1202. The pins 1202 may or not be spring-biased outward or inward, depending on the intended use. Upon translating the inner shaft 106, one or more of the balls or pins 1202 fall into the indentations 1210, which results in a smaller cross section or width of the distal end of the receiver main body 100 for fitting the receiver main body 100 into a lure 200. When the button 1204 is pressed, the inner shaft 1206 translates within, and with respect to, the head 1200 and outer sleeve portion 1208 (e.g. forward), thus displacing the one or more indentations 1210 at a distal of the inner shaft 1206; displacing the indentation 1210 causes one or more of the balls or pins 1202 to fall into the indentations 1210 to cause the cross section (the occupying volume of the assembly) to decrease enough to allow the receiver main body assembly to fit into the lure 200.

Once the receiver shaft 102 is inserted sufficiently into the lure 200 so that the pins 1202 overcome the lip 1215 (which, in preferred embodiments, requires insertion of the receiver shaft 102 all the way into the lure 200 such that a distal end of the receiver shaft 102 abuts against at a distal end of the cavity 202), as shown in FIG. 15, the button 1204 can be released to allow the compression spring 1228 to cause the inner shaft 1206 to retract and the indentations 1210 to move out of alignment with the balls or pins 1202, such that a relatively wider section 1212 of the inner shaft 1206 aligns with and pushes the balls or pins 1202 radially outward, as shown in FIG. 14. The outwardly protruding pins 1202 engage with a surface of the lure 200 such that said engagement blocks a rearward displacement of the pins 1202, causing the distal end of the receiver shaft 102 to lock into place; for example, the balls or pins 1202 in an extended position may protrude from the outer sleeve portion 1208 and fit within a lip 1215 or groove of the cavity of the lure 200.

Figure 12:
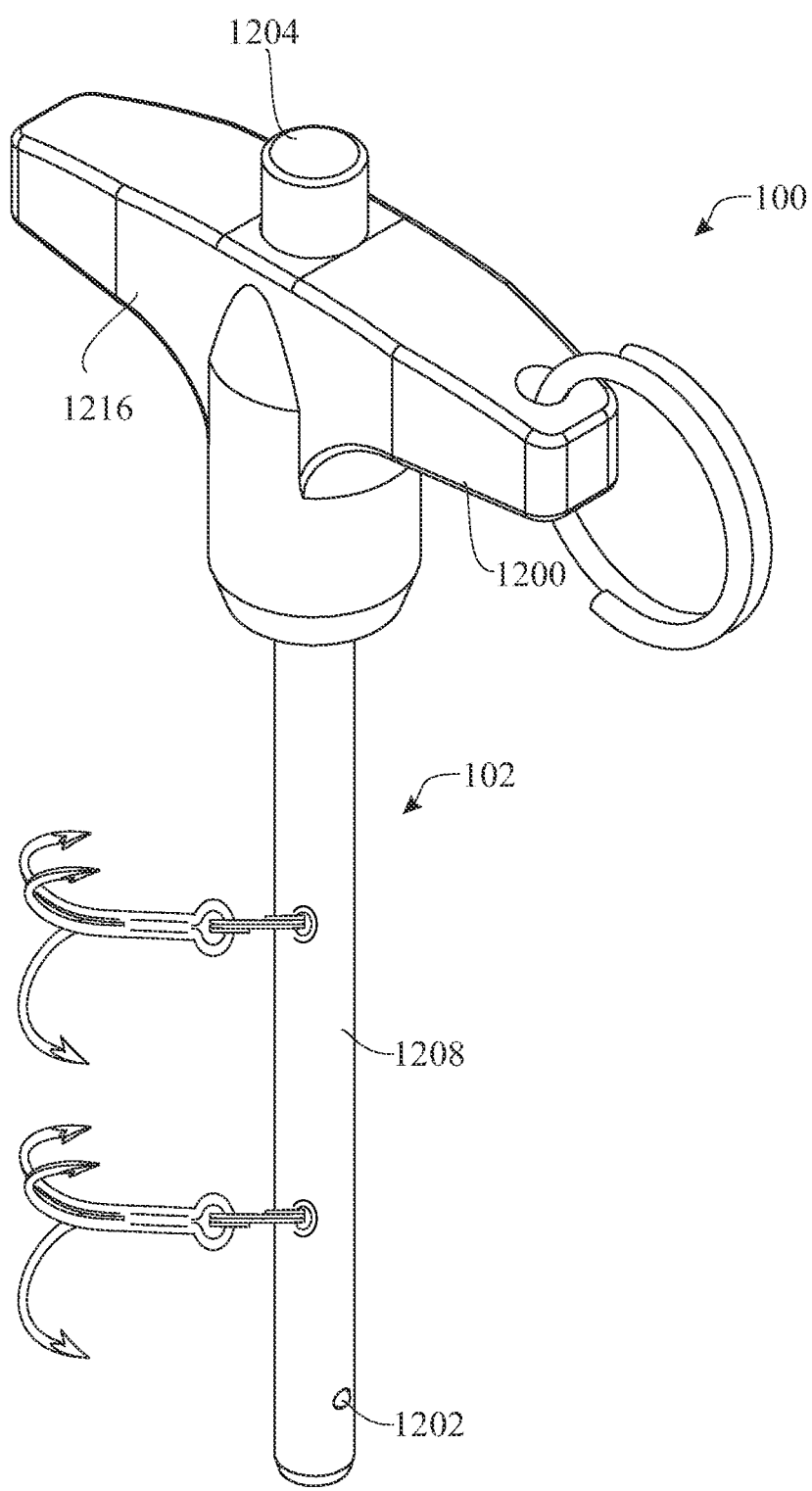
FIGS. 12-15 show attachment of another locking mechanism, in accordance with aspects of the present disclosure.

As best shown in FIG. 12, the head 1200 of the assembly may include a grip 1216, which may include laterally extending arms extending radially outward of the button 1204 and in different—and preferably opposite—directions, allowing the index finger and the middle finger to pull on the arms while pressing on the button 1204 between the arms. It is to be understood that any two fingers could be appropriately used to grip the arms while pressing the center button. The general goal of the arms is to provide a gripping surface to counter the force applied to the button 1204, to allow the inner shaft 1206 to translate with respect to the head 1200 and the outer sleeve portion 1208. The arms may include any appropriate shape, such as a conical or any lip that allows a user to grip the head 1200 while pushing the button 1204 at the same time with one or two hands.

The balls or pins 1202 can be held in place (e.g. kept from falling out of the outer sleeve portion 1208) in a variety of ways. One way would be to size holes in the outer sleeve portion 1208 such that the balls or pins 1202 extend from the outer sleeve portion 1208 in an extended position, while being kept from falling out from the assembly. Another way would be to add spring-bias to the balls or pins 1202 to keep the balls in an inwardly biased position, which are pushed out when the button is pressed and the indentations are displaced away from the position of the balls or pins 1202.

Figure 13:
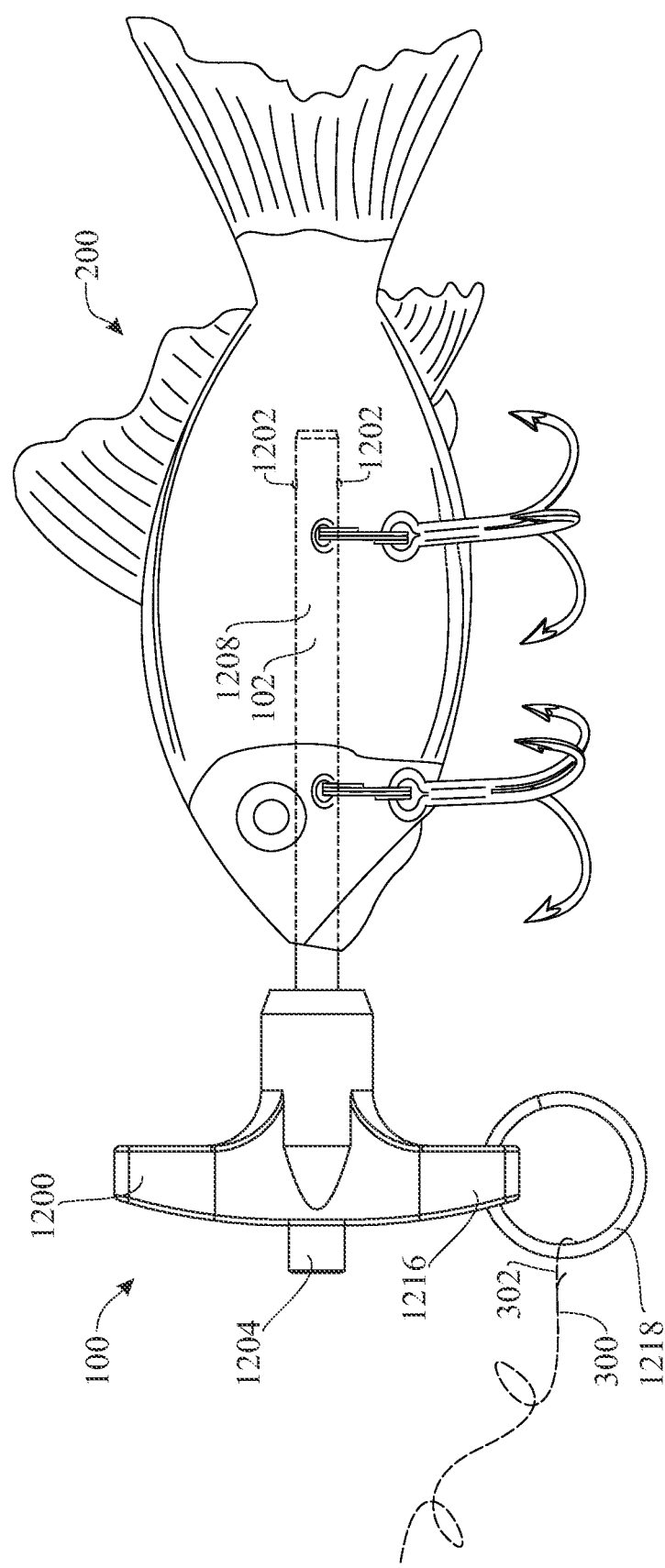

As shown in FIG. 13, a ring 1218 may be attached to the head 1200 such that a fishing line 300 or other apparatus can be attached to the ring, such as by a knot 302.

Figure 25:
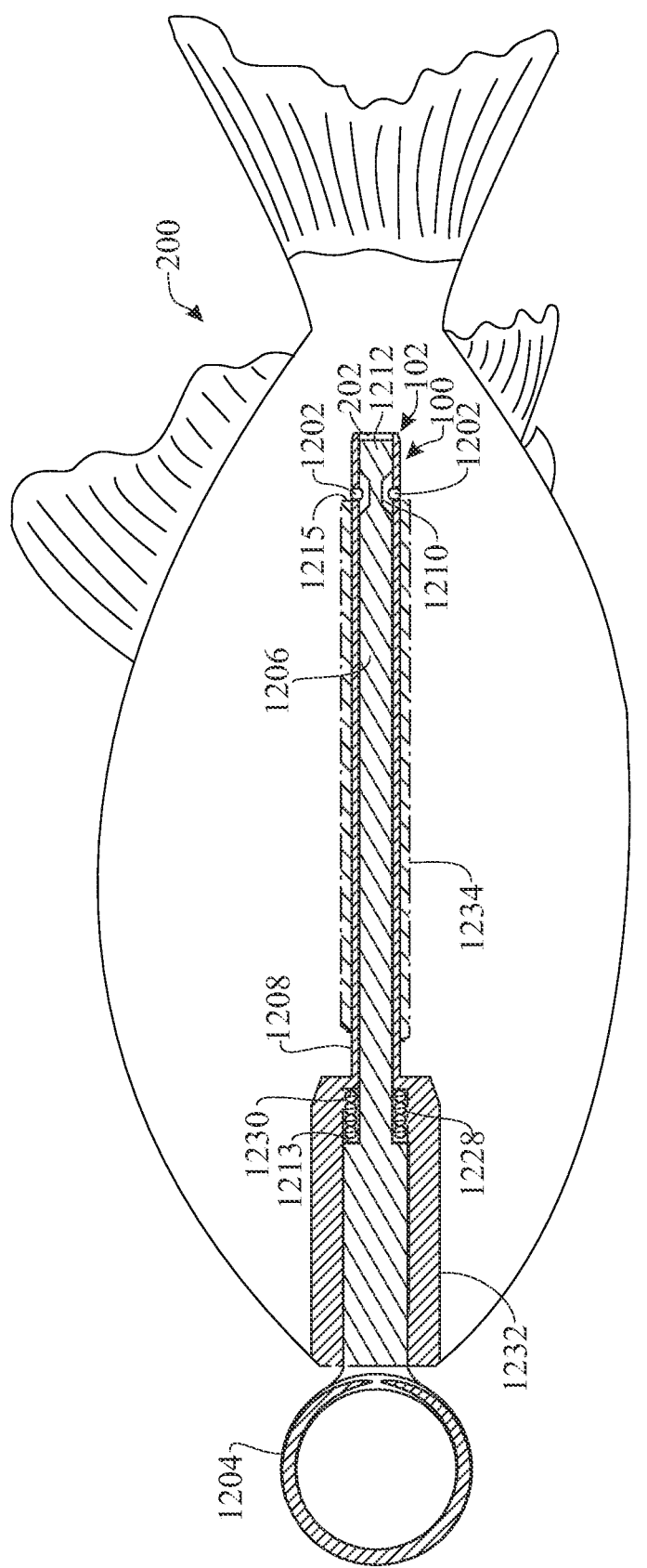
FIG. 25 shows a side view of a rapidly interchangeable fishing lure system, in accordance with another embodiment of the invention.

The illustration of FIG. 25 shows a variation in which the receiver main body 100 includes a receiver shaft 102 comprising an inner rod or shaft 1206 that displaces and translates within an outer sleeve portion 1208. A button 1204 (i.e. the manually compressible portion) is provided by a ring attached to a proximal end of the inner rod or shaft 1206 and located outside the lure 200. Similarly to the previous embodiment, the inner rod or shaft 1206 and the button 1204 are spring biased such that when the button 1204 is pressed, the one or more displaceable balls or pins 1202 arranged at an opposite end of the receiver shaft 102 displace radially between an extended position and a retracted position. In the present embodiment, the button 1204 is spring-biased by a compression spring 1228 located between a lip 1213 of the button 1204 and an inner wall 1230 of the outer sleeve portion 1208. The inner wall 1230 may be arranged, for instance and without limitation, in a proximal portion 1232 of the outer sleeve portion 1208, which may be wider than a distal portion 1234 of the outer sleeve portion 1208. Similarly to previous embodiments, the receiver main body 100 may be removably insertable from and connectable to the lure 200; for instance and without limitation, the outer sleeve portion 1208 may be threadable to the lure 200, such as inside the lure cavity 202.

Figure 17:
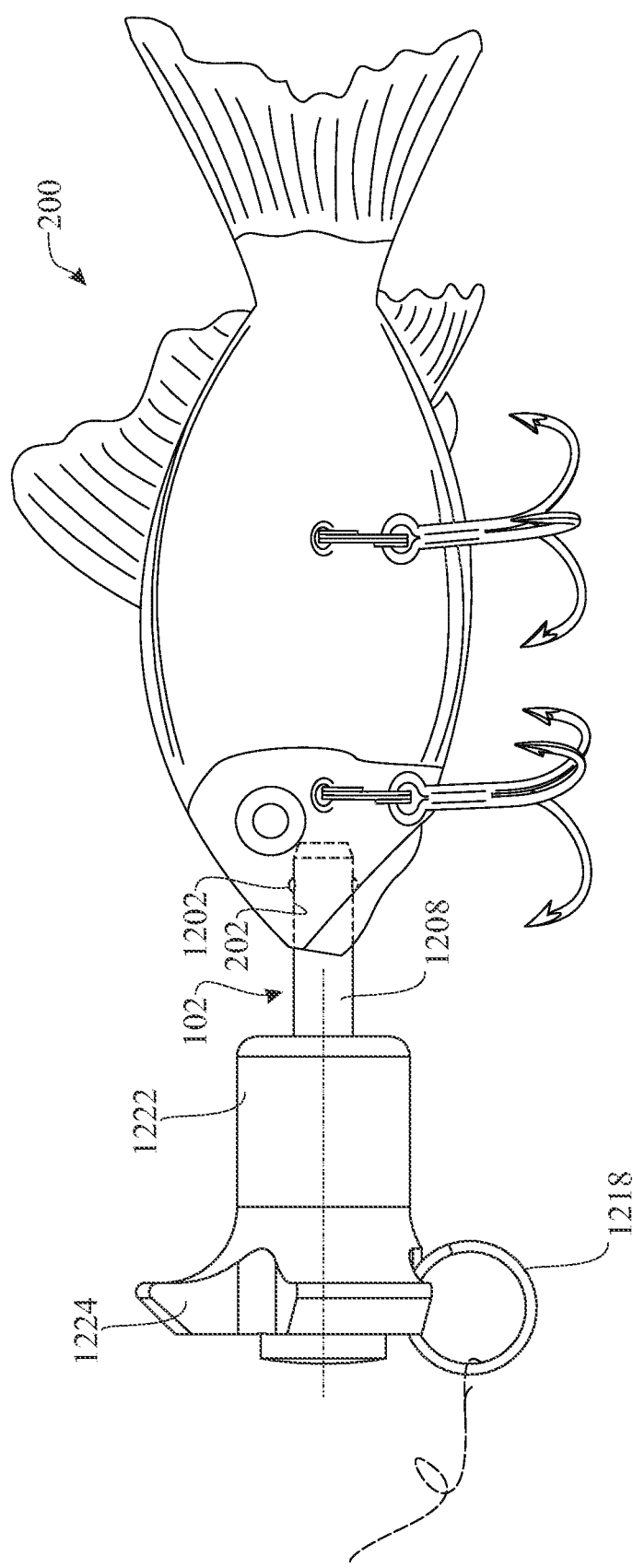
Figure 18:
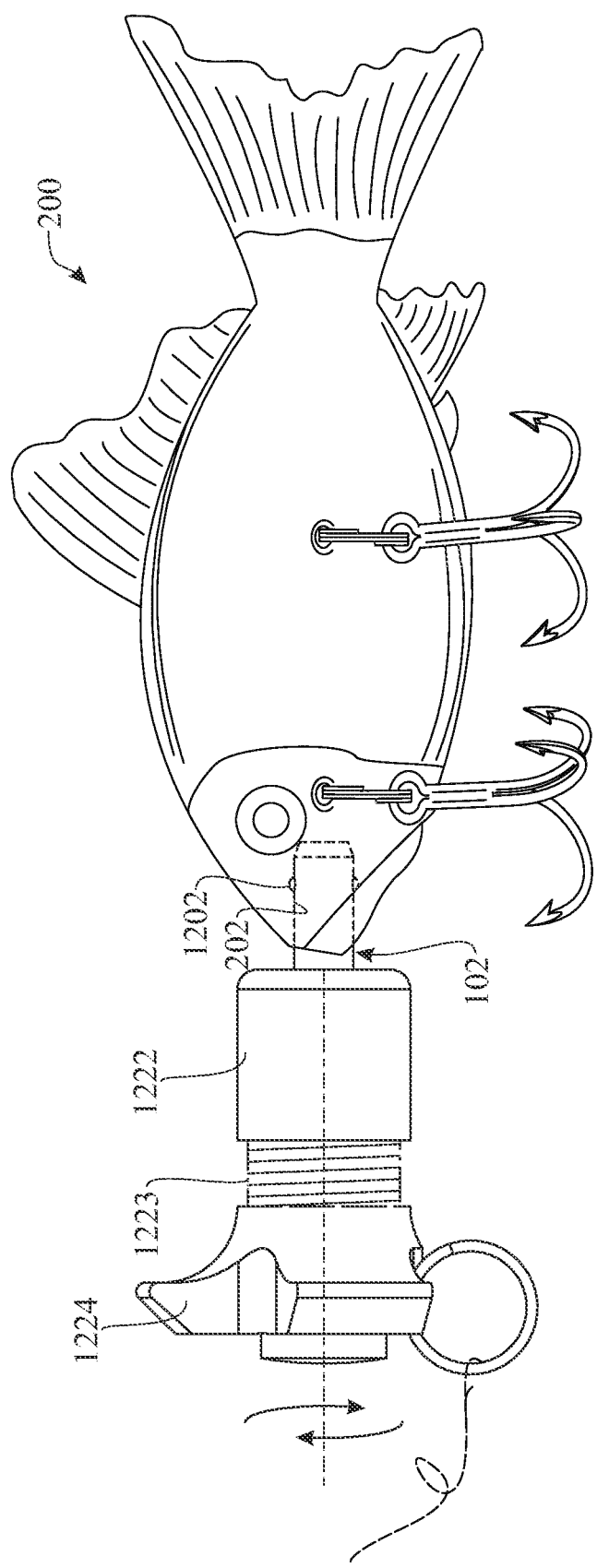
Figure 19:
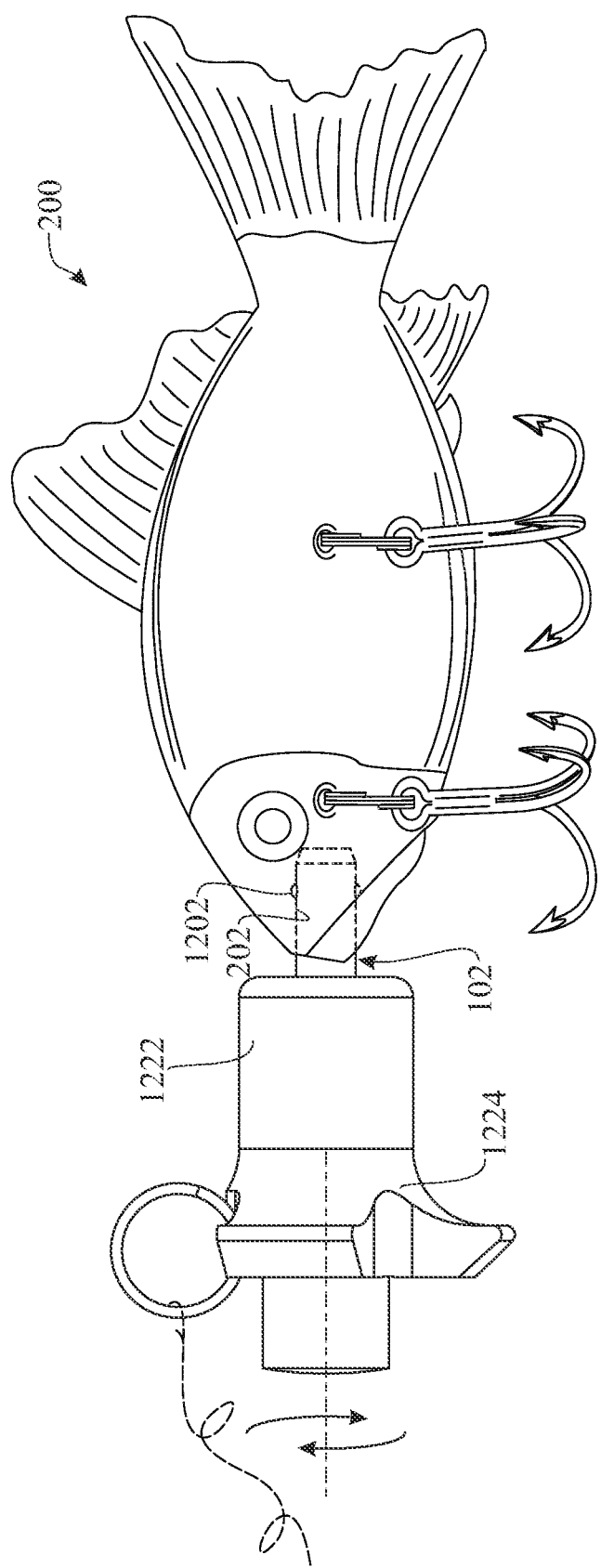
Figure 20:
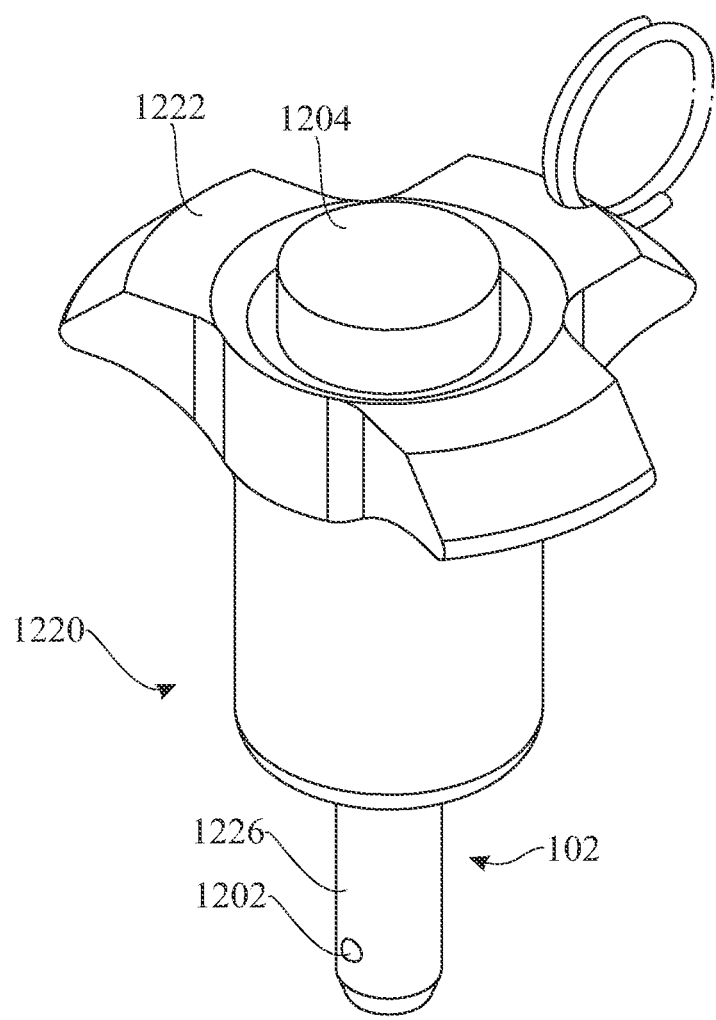
FIGS. 20-24 show a spring biased rod adjusting a clamping distance, in accordance with aspects of the present disclosure.
Figure 21:
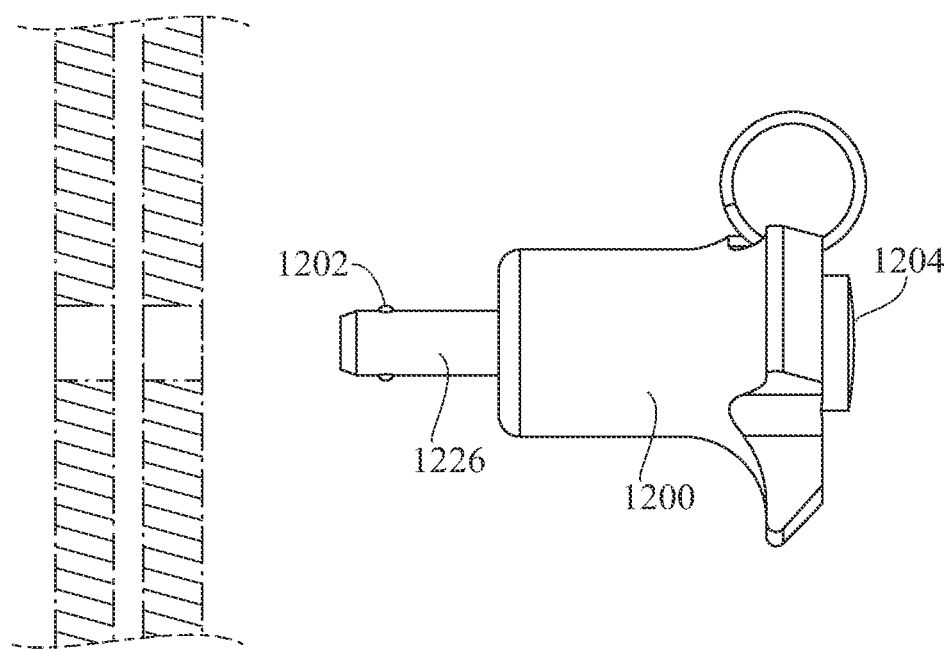

As shown in FIGS. 16-19, a tightening mechanism 1220 may be included to change a clamping distance of the assembly. For example, as shown in FIG. 17, the receiver shaft 102 has been successfully inserted into the cavity and the balls lock the rod assembly within the cavity 202 as mentioned above. Next, in FIG. 18, a distal piece or portion 1222 of the housing or head 1200 is rotated about a threaded shaft or axis 1223 (e.g. about a screw thread arrangement) such that the distal portion 1222 displaces distally toward the lure 200, thus eventually contacting the lure 200 and applying a force to the lure 200, as shown in FIG. 18. To further secure this configuration at this point, a proximal piece or portion 1224 of the housing or head 1200 (which may include the ring 1218 and the arms, and the handle), can be screwed in a similar manner toward the distal portion 1222 such that eventually the proximal portion 1224 contacts the distal portion 1222 to further secure both pieces 1222, 1224 against the lure 200, and furthermore apply a linear, longitudinal force to the lure 200 through the rotational action of both pieces 1222, 1224. In other words, the distal portion 1222 rotates to apply a clamping force to the lure 200, together with the balls or pins 1202 and the outer sleeve portion 1208, which are also fixed to the lure 200 as described heretofore. And further, the proximal portion 1224 rotates to add a further force transferred through the distal portion 1222. In this way, the clamping distance is defined, and the security of the arrangement is increased.

It is to be understood that other apparatuses other than the ones shown and mentioned herein may be attached between the rotating pieces (any combination thereof) or between a rotating piece and the lure, such that the apparatuses are attachable and securable to the arrangement through these rotating arrangements.

Figure 22:
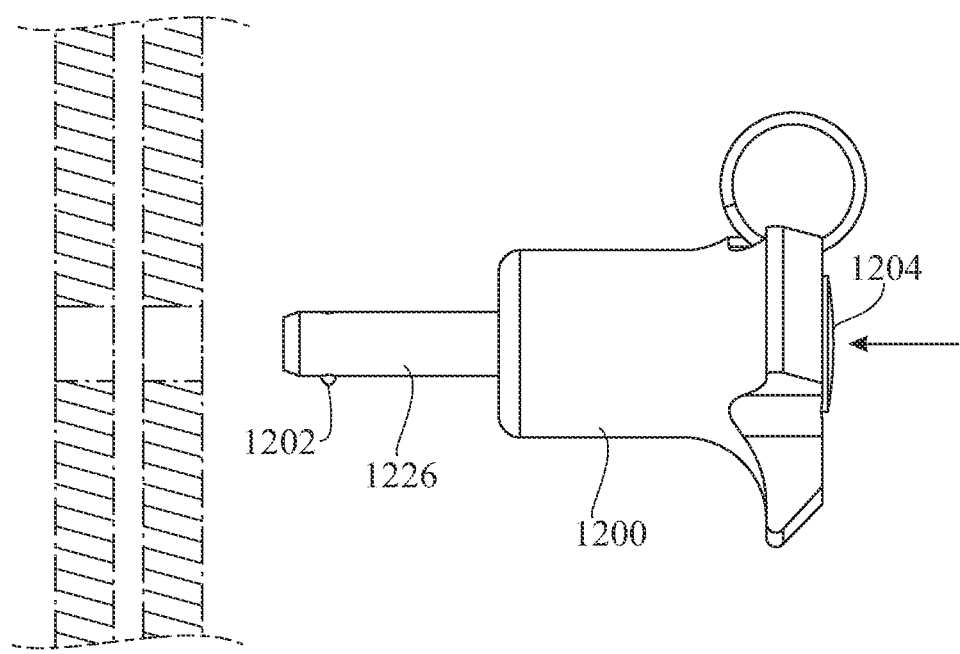
Figure 23:
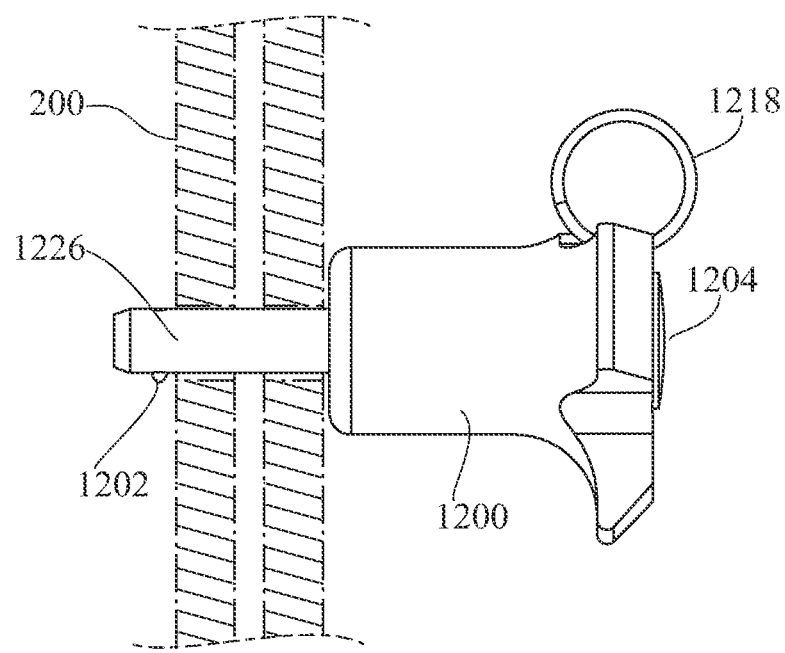
Figure 24:
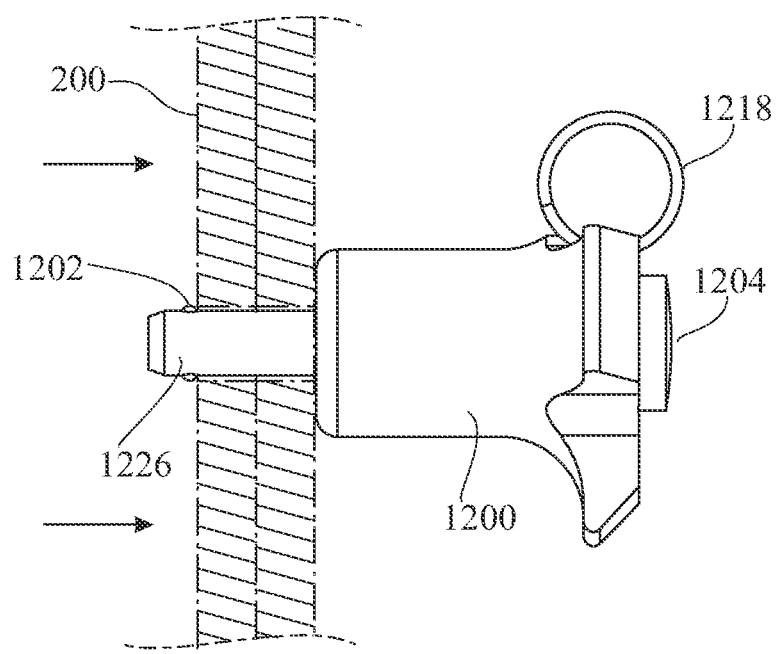

The illustrations of FIGS. 22, 23 and 24 show another arrangement that allows the rod or shaft 102 to clamp to the lure 200. This works by way of a spring biased rod 1226, which could be spring biased in a distal direction such that pushing the button 1204 overcomes the spring bias to extend the rod or shaft 102. When the button 1204 is released, the rod or shaft 102 retracts, i.e. is displaced rearward or towards the distal portion 1222. When the balls or pins 1202 are in an extended position, and when the button 1204 is released, the shaft 102 retracts while the balls or pins 1202 are extended, thus pulling a target surface (e.g. the lure 200) toward the proximal end (FIG. 24) and thus clamping the arrangement together. This can be accomplished by spring biasing the inner shaft 1206, and such that when the inner shaft 1206 passes a certain distance of displacement, both the inner shaft 1206 and the outer sleeve portion 1208 displace. In another example, both or just one of the inner shaft 1206 and outer sleeve portion 1208 are spring biased to accomplish this feature of FIGS. 22, 23, and 24. The outer sleeve portion 1208 and the inner shaft 1206 may be spring biased in the same direction, but separated by a longitudinal distance (e.g. this distance would need to be overcome by the inner shaft 1206 before the outer sleeve portion 1208 starts moving with the releasing/pressing of the button).

Figure 26:
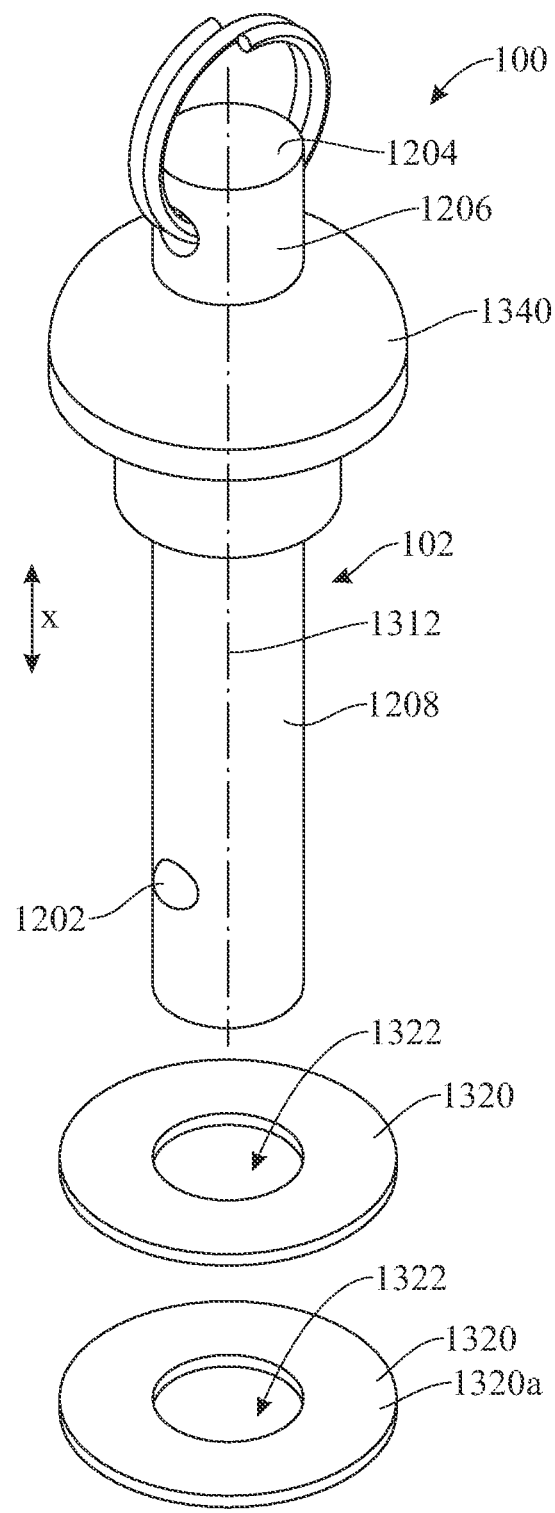
FIG. 26 presents an isometric view of a receiver main body and a pair of spacers of a fishing lure system in accordance with a further embodiment of the present invention.
Figure 27:
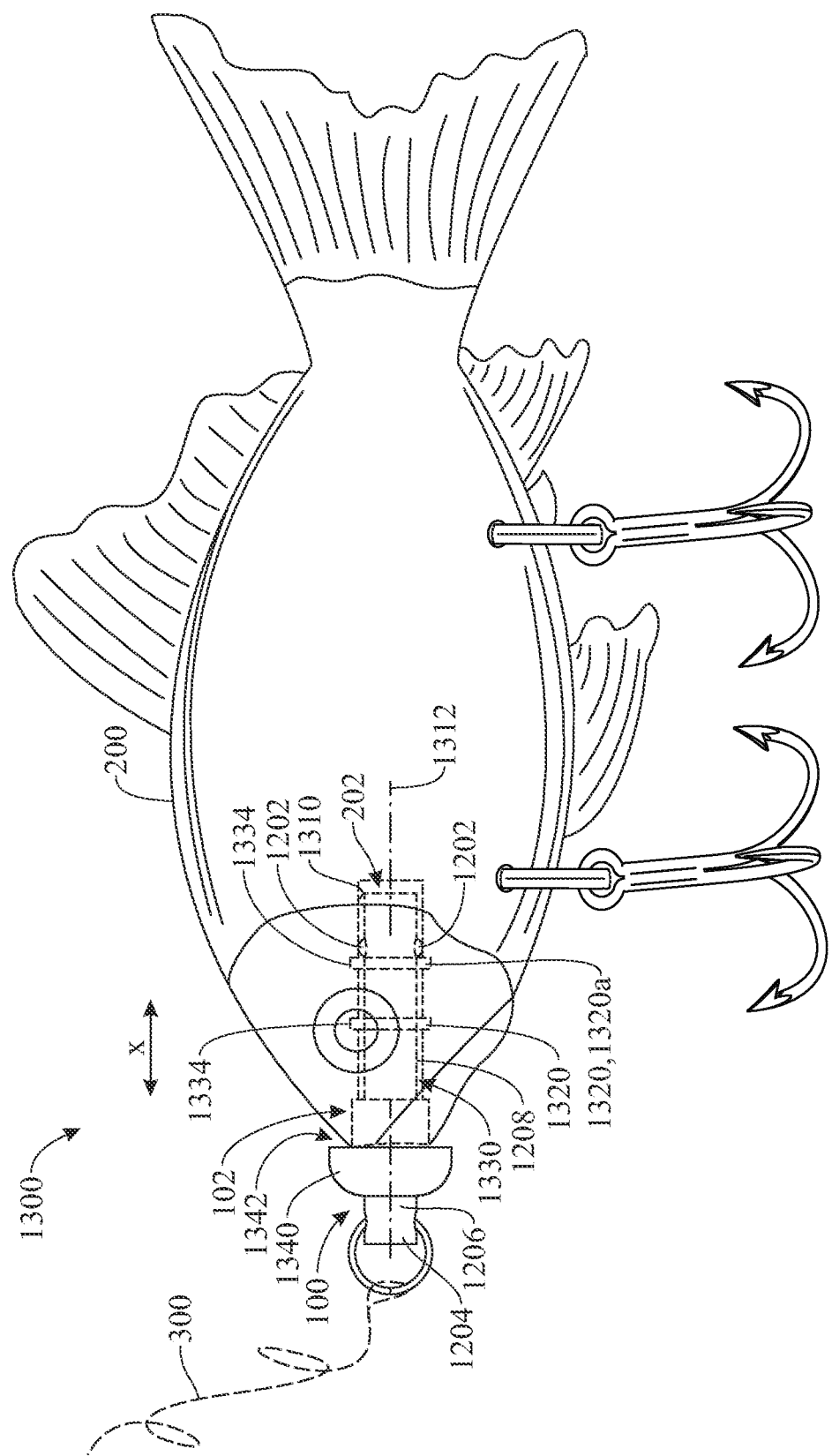
FIG. 27 presents a side elevation view of the receiver main body and spacers of FIG. 26 mounted within a fishing lure, in an assembled configuration of the fishing lure system.

The illustrations of FIGS. 26-30 show a rapidly interchangeable fishing lure system 1300 in accordance with a further embodiment of the present invention. With reference initially to FIGS. 26 and 27, the rapidly interchangeable fishing lure system 1300 includes fishing lure 200 and receiver main body 100, which is disconnectably attachable to the fishing lure 200 and configured for the connection thereto of fishing line 300. The fishing lure 200 comprises inner cavity 202 which, as in previous embodiments, is defined by at least one inner side wall 1310 of the fishing lure 200. For instance, in some embodiments, the inner cavity 202 may be generally cylindrical, and the at least one inner side wall 1310 may consist of a cylindrical sidewall; however, alternative shapes and configurations are contemplated without departing from the scope of the present disclosure. In some embodiments, the inner cavity 202 may be blind, as shown.

The receiver main body 100, in turn, includes receiver shaft or elongated shaft 102, which is removably insertable into the inner cavity 202 of the fishing lure 200. As in previous embodiments, the elongated shaft 102 includes inner shaft 1206 and outer sleeve portion 1208. The outer sleeve portion 1208 is elongately formed along a longitudinal direction x; for example, the outer sleeve portion 1208 may be cylindrical. The inner shaft 1206, in turn, is arranged longitudinally displaceable inside and relative to the outer sleeve portion 1208, i.e. is movable within the outer sleeve portion 1208 along the longitudinal direction x. Similarly to previous embodiments, the inner shaft 1206 includes or ends in proximal end or button 1204. The button 1204 is operable by a user from outside the fishing lure system 1300 to operate the inner shaft 1206, i.e. to displace the inner shaft 1206 longitudinally within the outer sleeve portion 1208. As in previous embodiments, the elongated shaft 102 includes at least one movable pin 1202 arranged between the inner shaft 1206 and the outer sleeve portion 1208, with the at least one movable pin 1202 being selectively moved radially outward or inward relative to a central longitudinal axis 1312 of the elongated shaft 102 or moved by selective operation of the inner shaft 1206 as described heretofore with reference for instance to FIGS. 14 and 15.

As shown in all of FIGS. 26-30, the fishing lure system 1300 of the present embodiment includes one or more spacers 1320. As best appreciated in FIG. 30, where the receiver main body 100 is shown disconnected and separated from the fishing lure 200, the spacer or spacers 1320 are arranged extending from the inner side wall or walls 1310 of the fishing lure 200. The spacer or spacers 1320 protrude from the one or more inner side walls 1310 into the inner cavity 202 of the fishing lure 200.

Figure 28:
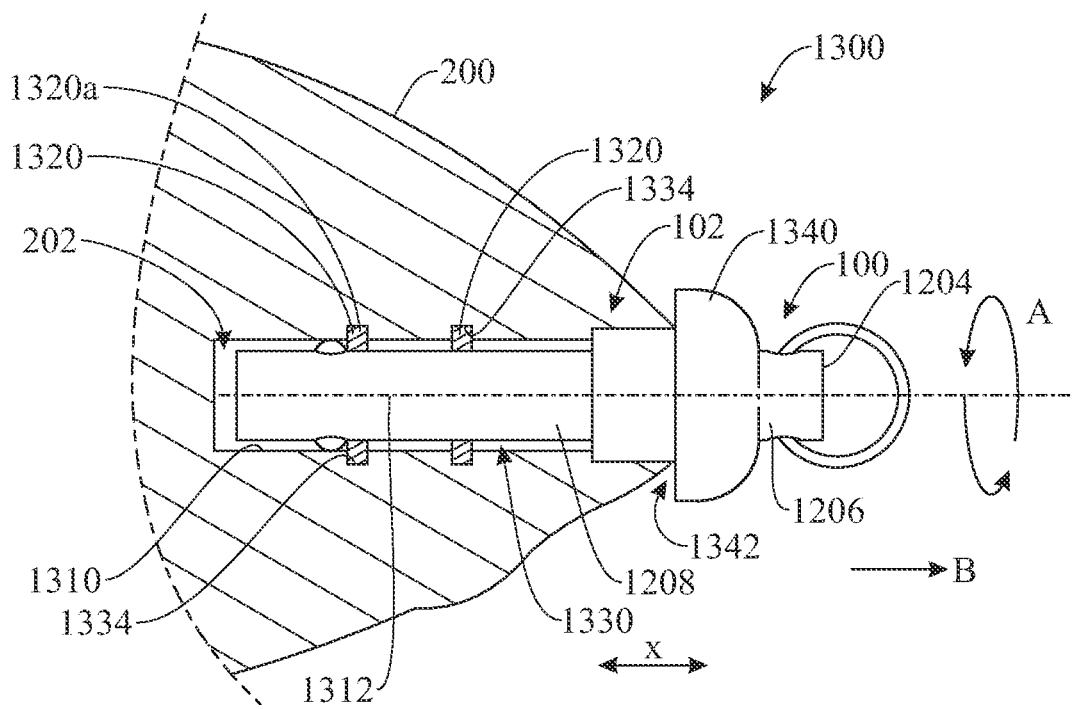
FIG. 28 presents a cross-sectional, side elevation view of the fishing lure system of FIG. 27.

The fishing lure system 1300 is configured to adopt an assembled configuration, shown in FIGS. 27 and 28. In this assembled configuration, the elongated shaft 102 of the receiver main body 100 is axially inserted into and received within the inner cavity 202 of the fishing lure 200. The one or more movable pins 1202 are arranged radially outward (i.e. pushed radially outward by the inner shaft 1206) and abut against at least one surface of the fishing lure 200, and more specifically, against the inner side wall 1310 defining the inner cavity 202, thereby securing the receiver main body 100 to the fishing lure 200. Furthermore, in this assembled configuration of the fishing lure system 1300, the one or more spacers 1320 stabilize the elongated shaft 102 of the receiver main body 100 laterally relative to the central longitudinal axis 1312 of the elongated shaft 102. In the event of a lateral pulling of the fishing line 300 on the receiver main body 100, the one or more spacers 1320 minimize or prevent a lateral swaying or shifting of the elongated shaft 102 within the inner cavity 202 of the fishing lure 200, thereby minimizing or eliminating the risk of the one or more movable pins 1202 from disengaging the inner side wall 1310 and the receiver main body 100 from undesirably disconnecting from the fishing lure 200. It should be noted that, in this context, 'lateral' is to be understood as a direction perpendicular to central longitudinal axis 1312 or having a component perpendicular to central longitudinal axis 1312.

In some embodiments, as shown in FIG. 28, in the assembled configuration of the fishing lure system 1300, the elongated shaft 102 is rotatable within the inner cavity 202 of the fishing lure 200 about the central longitudinal axis 1312 (as indicated by arrow A), while being longitudinally secured in place. Such ability to rotate of the elongated shaft 102 allows the elongated shaft 102 to adjust its rotational position as the fishing line 300 pulls thereon in different directions while using the fishing lure system 1300. This may prevent tangling of the fishing line 300 during use of the fishing lure system 1300 to carry out fishing activities.

Figure 29:
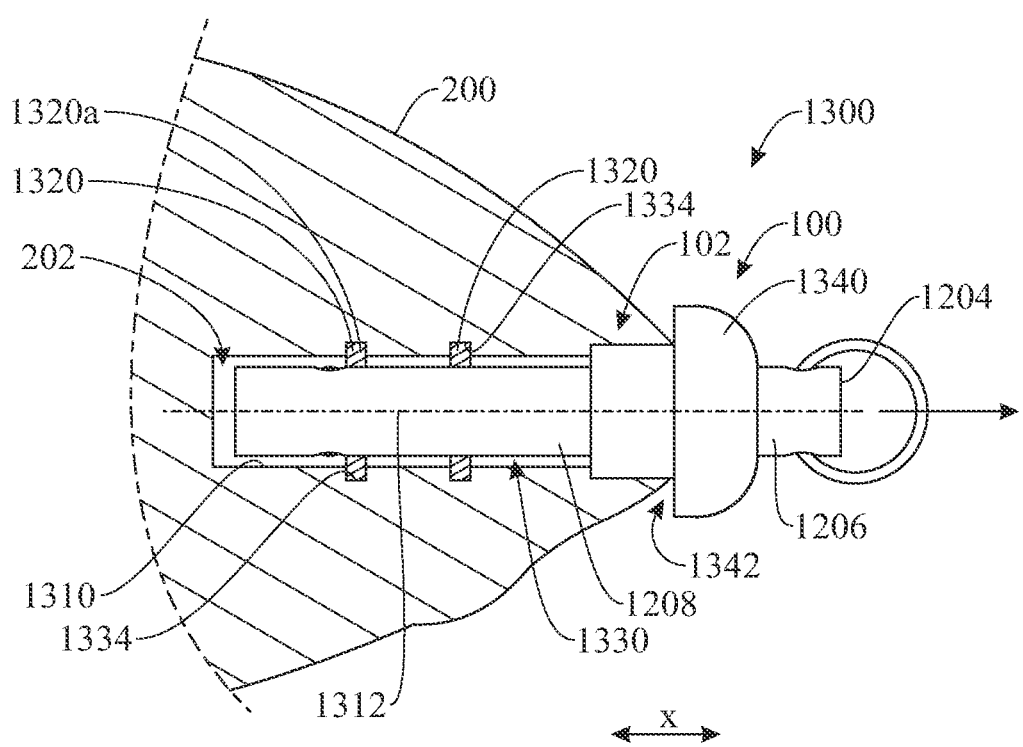
FIG. 29 presents a cross-sectional, side elevation view similar to FIG. 28, where the receiver main body has been operated to unlock the inner shaft of the elongated shaft of the receiver main body and allow for removal of the receiver main body from the inner cavity of the fishing lure.
Figure 30:
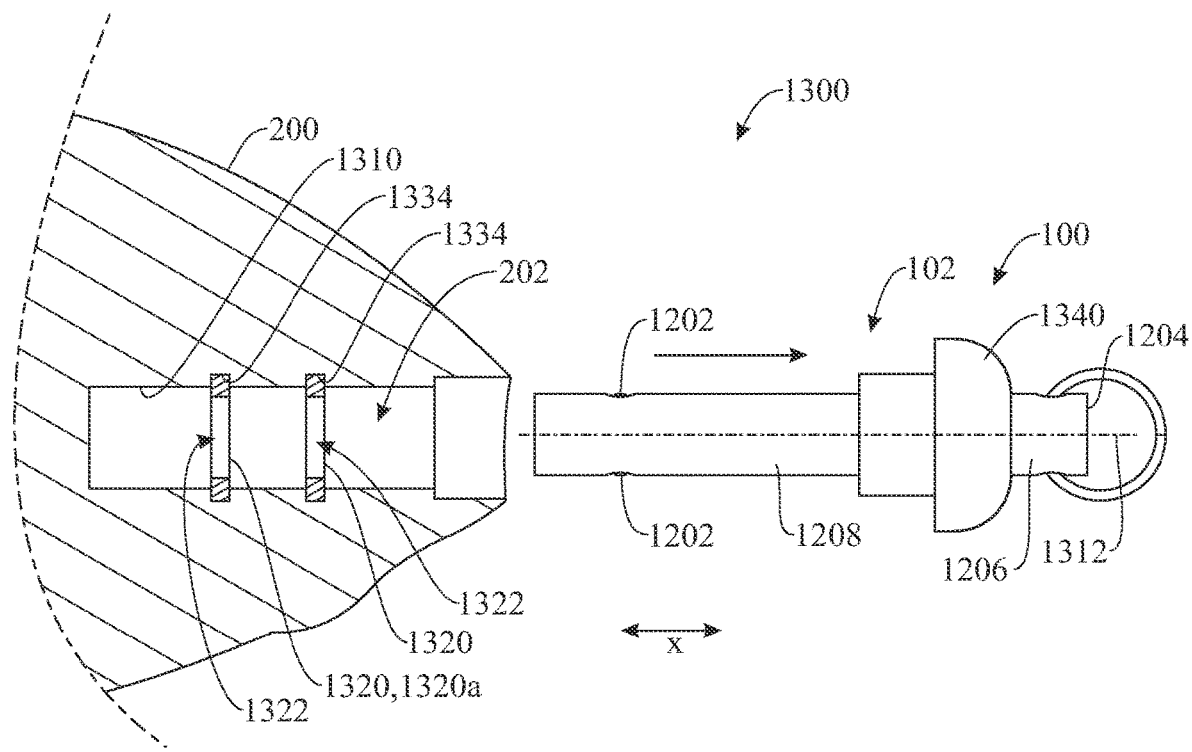
FIG. 30 presents a cross-sectional, side elevation view similar to FIG. 29, where the receiver main body is shown removed from the inner cavity of the fishing lure.

From the assembled configuration of FIGS. 27 and 28, operation of the inner shaft 1206 may allow the movable pins 1202 to move radially inward, as described heretofore with reference to FIGS. 14 and 15, allowing the elongated shaft 102 (and thus the receiver main body 100) to be longitudinally pulled out of the inner cavity 202 of the fishing lure 200, as indicated by arrows B and C in FIGS. 29 and 30, respectively. From the fully extracted position of FIG. 30, following an inverse sequence, the receiver main body 100 may be once more inserted into the same or a different, compatible fishing lure 200 for subsequent use. In this way, the fishing lure system 1300 of the present embodiment may provide a disconnectable and stabilized connection between a fishing line 300 and one or more compatible fishing lures 200, which may also prevent the fishing line from twisting up and weakening.

In some embodiments, such as the present embodiment, in the assembled configuration of FIGS. 27 and 28, the outer sleeve portion 1208 of the elongated shaft 102 is generally spaced apart from the inner side wall(s) 1310 such that a gap 1330 is defined between the outer sleeve portion 1208 and the inner side wall(s) 1310. The outer sleeve portion 1208 may be maintained in spaced-apart relationship with the at least one inner side wall 1310 of the fishing lure 200 by the one or more spacers 1320. Such a configuration may facilitate insertion and removal of the elongated shaft 102 within the inner cavity 202 of the fishing lure 200, while providing a lateral stabilization of the elongated shaft 102 within the inner cavity 202. In some embodiments, such as the present embodiment, the gap 1330 may encircle the outer sleeve portion 1208 about the central longitudinal axis 1312 of the elongated shaft 102, thereby maximizing ease of insertion and removal while unaltering the stabilization effect of the at least one spacer 1320.

In some embodiments, such as the present embodiment, at least one spacer 1320 of the one or more spacers 1320 is non-movable relative to the at least one inner side wall 1310 of the fishing lure 200 in the longitudinal direction x. For instance, the non-movable spacer or spacers 1320 may be mounted within a recess 1334 formed in the at least one inner side wall 1310 of the fishing lure 200 and extend from the recess 1334 into the inner cavity 202 of the fishing lure 200. The mounting within the recess 1334 may prevent the spacer or spacers 1320 from displacing longitudinally. In some embodiments, such as the present embodiment, all of the one or more spacers 1320 included in the fishing lure system 1300 are non-movable relative to the at least one inner side wall 1310 of the fishing lure 200 in the longitudinal direction x. Alternatively or additionally, in some embodiments, such as the present embodiment, the fishing lure system 1300 may include two or more spacers 1320, i.e. a plurality of spacers 1320, arranged in longitudinally-spaced apart relationship with one another, wherein each spacer of the plurality of spacers 1320 is non-movable relative to the at least one inner side wall 1310 of the fishing lure 200 in the longitudinal direction. The present embodiment specifically includes only a pair of spacers 1320 arranged in longitudinally-spaced apart relationship with one another, with each spacer of the pair of spacers 1320 being non-movable relative to the at least one inner side wall 1310 of the fishing lure 200 in the longitudinal direction x. Such specific embodiments based on only two spacers 1320 provide a cost-effective, easy to manufacture, lightweight solution, which, by means of the longitudinal separation between the spacers 1320, are equally capable of optimally stabilizing the elongated shaft 102 in a lateral direction.

In some embodiments, at least one spacer of the one or more spacers 1320 extends around an entire periphery of the elongate shaft about the central longitudinal axis 1312. Such configuration provides optimal lateral stability in virtually any lateral direction. In some embodiments, more specifically, the spacer or spacers 1320 that extend around an entire periphery of the elongated shaft 102 may be formed as a respective, generally flat, ring-shaped washer including a central opening 1322 through which the elongated shaft 102 of the receiver main body 100 may be extended. In some embodiments, all of the one or more spacers 1320 included in the fishing lure system 1300 may extend around the entire periphery of the elongated shaft 102 about the central longitudinal axis 1312; for example, in the present embodiment, both spacers 1320 are configured to receive the elongated shaft 102 therethrough and to extend around the entire periphery of the elongated shaft 102 when the elongated shaft 102 is inserted through the spacer 1320.

In some embodiments, at least one spacer of the one or more spacers 1320 may be more rigid than the at least one inner side wall 1310 of the fishing lure 200. For instance and without limitation, the relatively more rigid spacer or spacers 1320 may be made of plastic or metal (e.g., aluminum, stainless steel, etc.) which is more rigid than a relatively more deformable material (e.g., soft plastic, rubber, etc.) of the inner side wall(s) 1310 of the fishing lure 200 from which the spacer or spacers 1320 extend. The more rigid spacer or spacers 1320 may successfully stabilize the elongated shaft 102 as discussed heretofore while allowing the fishing lure 200 to be made of softer materials. In some embodiments, the spacer or spacers 1320 which are more rigid than the adjacent inner side wall(s) 1310 may, in fact, be generally undeformable such that the spacer or spacers 1320 maintain their shape during operation of the fishing lure system 1300. For example, in an advantageous embodiment of the invention, the one or more spacer or spacers 1320 may be formed as rigid, undeformable, metal washers. In some embodiments, such as the present embodiment, the spacer(s) 1320 may be formed as separate parts and may be mounted and secured to the fishing lure 200, such as by a frictional fitting within the recess(es) 1334, an adhesive, and/or other fastening mechanism. In other embodiments, one or more spacers 1320 may be integrally-formed with the fishing lure 200, such as by bi-material plastics injection molding.

In some embodiments, in the assembled configuration of FIGS. 28 and 29, an innermost spacer 1320a of the one or more spacers 1320 may be arranged longitudinally adjacent to the at least one movable pin 1202 and may block a longitudinal displacement of the at least one movable pin 1202 along the inner cavity 202 of the fishing lure 200 in an extraction direction (indicated by arrow B). In this way, the innermost spacer 1320a may block a longitudinal displacement of the elongated shaft 102 relative to the at least one inner side wall 1310 of the fishing lure 200. The spacer(s) 1320 may thus not only laterally stabilize the elongated shaft 102, but also contribute to prevent accidental or undesired removal of the elongated shaft 102 from the inner cavity 202 of the fishing lure 200.

In some embodiments, the outer sleeve portion 1208 of the receiver main body 100 may include a grip 1340, configured for engagement thereto of one or more fingers of a hand of a user facilitating operating the inner shaft 1206 (e.g., via button 1204) with at least one other finger of said hand of the user. For example, as with previous embodiments, a user may engage the grip 1340 with the index and middle fingers of one hand and may more easily operate the button 1204 with the thumb of the same hand. As can be seen in FIGS. 27-29, when the elongated shaft 102 is inserted into the inner cavity 202 of the fishing lure 200, the grip 1340 may be arranged adjacent to the fishing lure 200 and a space or gap 1342 may be defined between the fishing lure 200 and grip 1340 to facilitate engaging the grip 1340 with one or more fingers while operating the button 1204. It should be noted that, while the grip 1340 shown in FIGS. 26-30 is generally dome-shaped, alternative shapes or configurations may be used, such as, but not limited to, that of grip 1216 shown for instance in FIG. 12. In some embodiments, the receiver main body 100, and more specifically, the head 1200 of the receiver main body 100 (which may provide grip 1340 in some embodiments) may include a ring 1350. The fishing line 300 or another apparatus can be attached to the ring 1350, such as by a knot 1352. It should be noted that, while the head 1200 of the present embodiment is generally dome-shaped, alternative head configurations such as that of FIGS. 12-24 are contemplated.

It is to be understood that although a lure is shown in the figures (e.g. with hooks attached) any appropriate fishing apparatus that has, or is capable of having a cavity, can be attached to the receiver rod or shaft arrangement. The locking mechanism could be used instead of a knot. With respect to a conventional bobber, a user would normally have to tie a knot to the top to connect to the line. Instead, the user could use the disclosed locking mechanism. The user will be able to insert the rod (lock) into a cavity of the bobber to connect. The bobber will need to have a hole the length of the rod for this to be accomplished. This idea could apply to any fishing apparatus.

For example, a 3-pronged hook, fly fishing lure, spoon lure, fishing lure jig, jig head (soft plastics), bobber, 3-way swivel, weight, Sabiki rig, and stinger rig, could use the disclosed locking mechanism instead of having a place to tie a knot. Instead of a loop/circle for the user to tie a knot, a cavity will be created and utilized for the user to insert the rod into.

An umbrella rig and the Sabiki rig will utilize the same premise, where the user would normally attach the line, the user will be able to insert a rod into a cavity; where the knot would normally be tied.

Weights could have a cavity inside them allowing the user to insert the locking rod. There are many different types of shapes of weights the disclosed locking mechanism could connect to, with accommodating modifications as mentioned above.

In other words, the disclosed locking mechanism could work for all fishing apparatuses capable of having a cavity to receive the disclosed locking mechanism.

For apparatuses that are not capable of having a cavity, a cavity module can be attached to such devices to receive the locking mechanism/rod. In other words, they would have attachable a place for the user to insert the rod to lock the items.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A rapidly interchangeable, fishing lure system, comprising:
    a fishing lure, comprising an inner cavity defined by at least one inner side wall of the fishing lure;
    a receiver main body, disconnectably attachable to the fishing lure and configured for the connection thereto of a fishing line, the receiver main body comprising an elongated shaft removably insertable into the inner cavity of the fishing lure, the elongated shaft comprising:
        an outer sleeve portion, elongately formed along a longitudinal direction,
        an inner shaft arranged longitudinally displaceable inside and relative to the outer sleeve portion, the inner shaft operable for longitudinal displacement from outside the fishing lure system, and
        at least one movable pin arranged between the inner shaft and the outer sleeve portion, the at least one movable pin selectively movable radially outward or inward relative to a central longitudinal axis of the elongated shaft responsively to operation of the inner shaft; and
    a plurality of washers, mounted in longitudinally-spaced-apart relationship with one another to the at least one inner side wall of the fishing lure and extending radially inward from said at least one inner side wall into the inner cavity of the fishing lure; wherein
    the fishing lure system is configured to adopt an assembled configuration in which the elongated shaft of the receiver main body is received within the inner cavity of the fishing lure along an overlapping length of the at least one inner side wall and the outer sleeve portion, and the receiver main body and the fishing lure are disconnectably secured to one another by said at least one movable pin being arranged radially outward and abutting against the at least one inner side wall of the fishing lure, and further in which the plurality of washers maintains the receiver main body spaced apart from the at least one inner side wall along the entire overlapping length and along the entire periphery of the outer sleeve portion about the central longitudinal axis and stabilizes the elongated shaft of the receiver main body laterally relative to the central longitudinal axis.

2. The rapidly interchangeable fishing lure system of claim 1, wherein at least one washer of the plurality of washers is more rigid than the at least one inner side wall of the fishing lure.

3. The rapidly interchangeable fishing lure system of claim 1, wherein, in the assembled configuration, an innermost washer of the plurality of washers is arranged longitudinally adjacent to the at least one movable pin and blocks a longitudinal displacement of the at least one movable pin along the inner cavity of the fishing lure thereby blocking a longitudinal displacement of the elongated shaft relative to the at least one inner side wall of the fishing lure to remove the elongated shaft from the inner cavity of the fishing lure.

4. The rapidly interchangeable fishing lure system of claim 1, wherein the outer sleeve portion of the receiver main body comprises a grip configured for engagement thereto of one or more fingers of a hand of a user facilitating operating the inner shaft with at least one other finger of said hand of the user.

5. The rapidly interchangeable fishing lure system of claim 1, wherein the receiver main body comprises a ring for the connection thereto of the fishing line.

6. The rapidly interchangeable fishing lure system of claim 1, wherein at least one washer of the plurality of washers is non-movable relative to the at least one inner side wall of the fishing lure in the longitudinal direction.

7. The rapidly interchangeable fishing lure system of claim 6, wherein said at least one washer is non-longitudinally-movably mounted within a recess formed in the at least one inner side wall of the fishing lure and extends from said recess into the inner cavity of the fishing lure.

8. The rapidly interchangeable fishing lure system of claim 6, wherein all of the plurality of washers are non-movable relative to the at least one inner side wall of the fishing lure in the longitudinal direction.

9. The rapidly interchangeable fishing lure system of claim 8, wherein the plurality of washers consists of a pair of washers.

10. The rapidly interchangeable fishing lure system of claim 1, wherein, in the assembled configuration of the fishing lure system, at least one washer of the plurality of washers extends around an entire periphery of the elongate shaft about the central longitudinal axis.

11. The rapidly interchangeable fishing lure system of claim 10, wherein said at least one washer is generally flat and ring-shaped, wherein, in the assembled configuration of the fishing lure system, the elongate shaft extends through a central opening of said at least one washer.

12. The rapidly interchangeable fishing lure system of claim 11, wherein, in the assembled configuration of the fishing lure system, all of the plurality of washers extend around the entire periphery of the elongate shaft about the central longitudinal axis.

13. The rapidly interchangeable fishing lure system of claim 12, wherein the plurality of washers consists of a pair of washers.

\* \* \* \* \*